Inventor
Nicholas Monsarrat
By Thomas A. Jouches
Attorney

May 10, 1949.　　　　N. MONSARRAT　　　　2,470,043
APPARATUS FOR DRYING HAVING SAFETY
AND SEQUENCE CONTROLS
Filed April 15, 1942　　　　　　　　　　10 Sheets-Sheet 5

Inventor
Nicholas Monsarrat
By Thomas A. Jenkins
Attorney

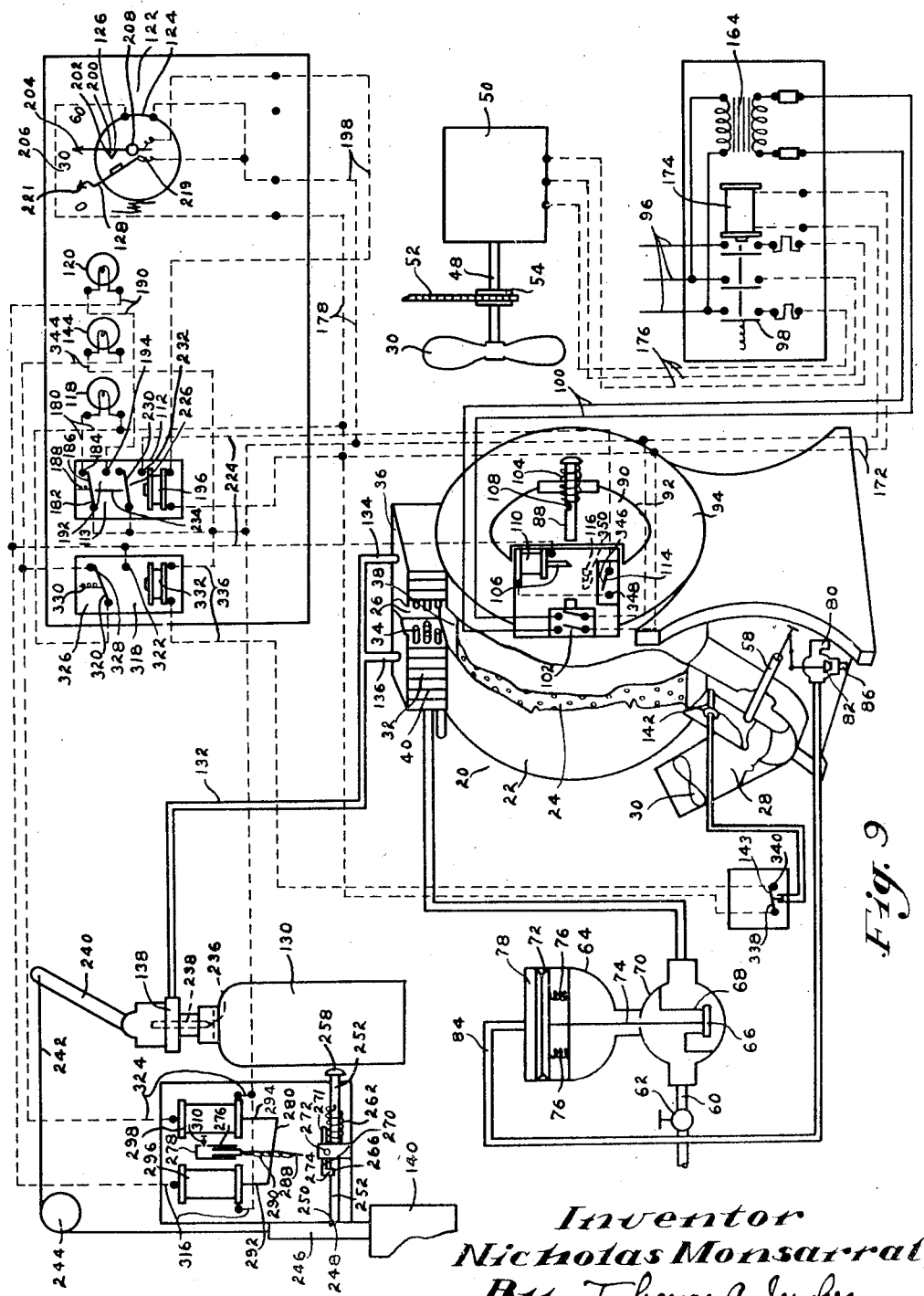

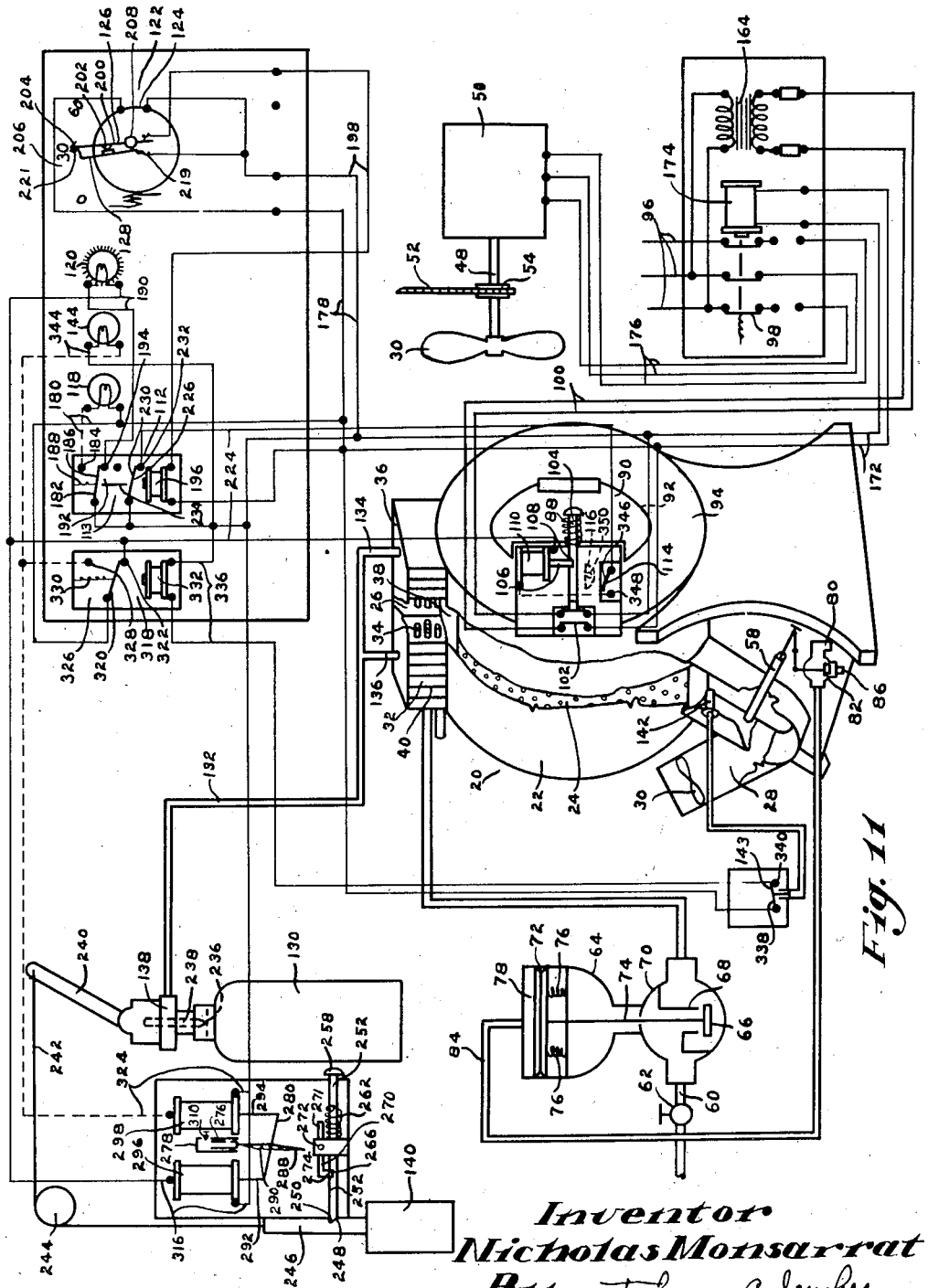

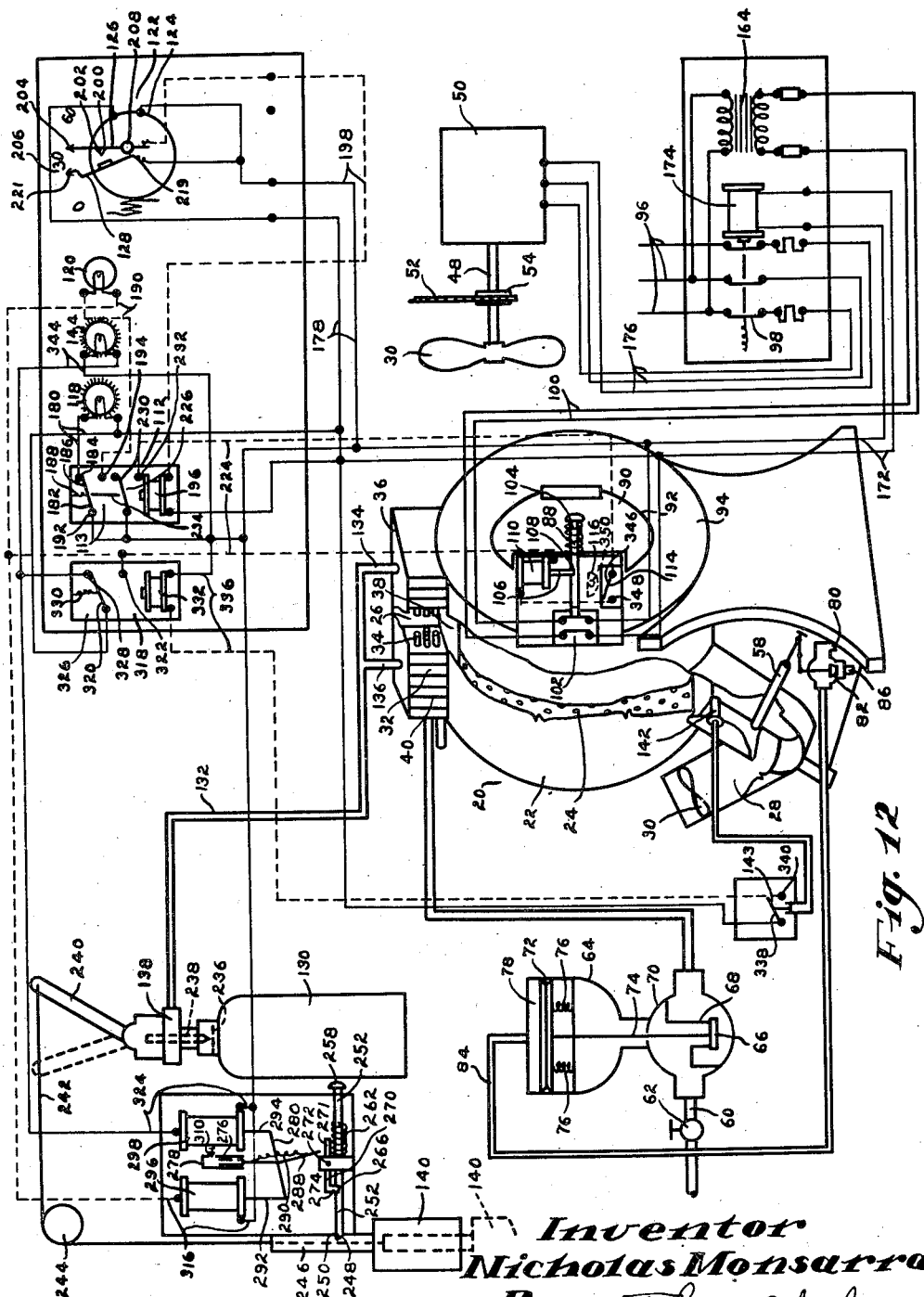

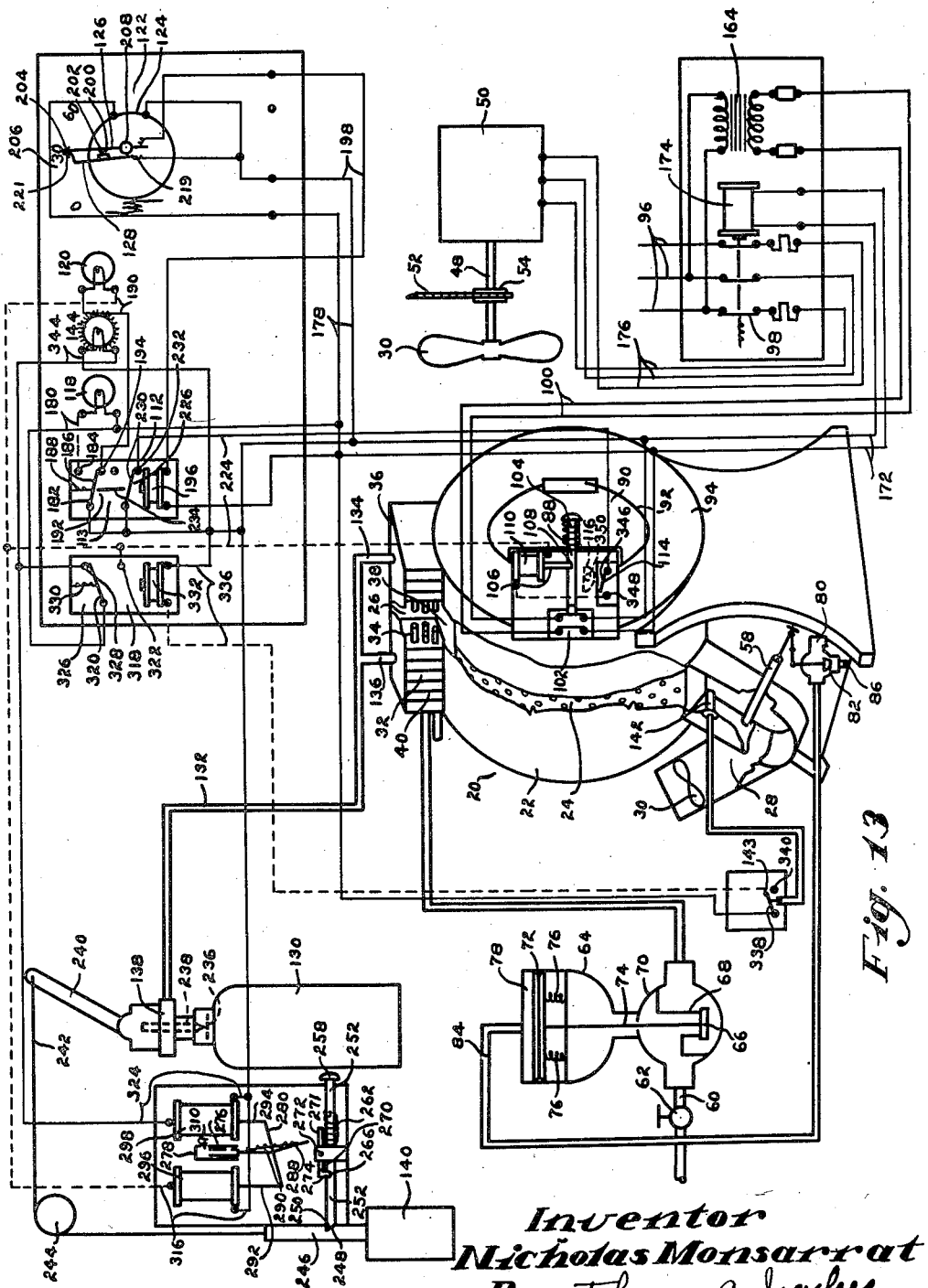

Patented May 10, 1949

2,470,043

UNITED STATES PATENT OFFICE 2,470,043

APPARATUS FOR DRYING HAVING SAFETY AND SEQUENCE CONTROLS

Nicholas Monsarrat, Rumford, R. I., assignor, by mesne assignments, to Pantex Manufacturing Corporation, a corporation of Delaware Application April 15, 1942, Serial No. 439,027

42 Claims. (Cl. 34—45)

My invention relates to improvements in apparatus for drying and particularly relates to a novel method and apparatus useful in dry cleaning in removing without danger of explosion residual solvent from materials dry cleaned with an inflammable hydrocarbon solvent of known flash point.

In the dry cleaning of garments, it has been the usual practice to treat them in a so-called washer with a suitable solvent, then centrifuge the goods to remove excess moisture therefrom in a centrifuge and treat them in a drying apparatus to remove residual solvent therefrom prior to pressing them in a garment pressing machine. This drying or removal of residual solvent has usually been accomplished in a so-called tumbling machine of a type having a container or basket for holding the garments, suitably agitated usually by rotating or tumbing it and passing preheated air through the garment containing basket in contact with the garments. In the prior art all sorts of 2, 3, or 4 stage methods have been employed for this purpose, and all sorts of complicated apparatus have been employed for automatically controlling the transition from stage to stage in the drying or tumbling operation.

In certain prior art structures of which I am aware, it has been the practice to evaluate the temperature of the treated air just prior to its passage through the basket. This has proved so inefficient that it has been necessary to use 3 or 4 cycles in the drying method, requiring complicated apparatus for their automatic changing. In these prior art devices it has been thought necessary to keep the temperature of the air entering the container below the flash point of the solvent employed. I have discovered that the only danger of providing an explosive mixture is when the air contains cleaning solvent after contact with the garments, and that due to the latent heat of evaporation of the solvent from the garments being treated, the temperature drops substantially 50° F., when employing a standard type of 138° F. to 140° F. flash point hydrocarbon solvent as it passes through the basket and garments and that prior art tumblers have been operated at a much lower inefficient temperature than is necessary to prevent explosion. I have further discovered that if the temperature of the treated air leaving said basket reduced by the latent heat of evaporation of cleaning solvent in said garments is evaluated and the preheating of the drying air controlled thereby there will be no danger of explosion if this temperature, which as stated is usually 50° F. less than the temperature of the air entering the basket, is kept below the flash point of the inflammable hydrocarbon solvent. I have also discovered that with this higher permissible temperature of drying air entering the basket that the drying efficiency of the device is so improved that the device will dry the garments and remove the residual solvent without danger of explosion in a short single stage treatment, thereby eliminating the necessity for the complicated apparatus formerly required in automatically changing the stages of operation of the drying tumbler in prior art structures. This is accomplished by evaluating the temperature of the air leaving the container, which is the only air which can contain the solvent and hence explode and controlling the temperature of the heating apparatus for preheating the drying air by the changes in temperature of this air containing residual solvent, thereby insuring that at the only possible danger point the temperature of the explosive mixture containing air and residual solvent is maintained at a safe temperature not materially higher than the flash point of the solvent and hence below a predetermined inflammable level.

A further object of my invention is to provide a suitable apparatus for so controlling the temperature of the air leaving the basket at a non-inflammable level.

My invention also includes various types of novel safety devices which are preferably employed in association with the aforementioned principle. These include a switch in the control circuit for the fan and motor for rotating the tumbler which is closed only by the operation of the door bolt after the door is positively closed. They also include an improved safety feature which positively prevents again opening the door until the temperature is below a predetermined positively non-explosive level. They also include a switch operated by a time clock and a latching device for the door bolt which will positively prevent release of the door bolt to open the door until the basket has been agitated a sufficient period of time to remove the solvent therefrom. As stated, this unlatching device for the door bolt is positively prevented from operating if the temperature rises above a predetermined safety level. These also include a safety signal system which will denote operation of the tumbler after the circuit is completed by closing the door bolt for an adjustable predetermined period of time regulated by a time clock, which at the completion of said adjustable period of time automatically switches signals to indicate the completion of the operation and that it is safe to open the door and preferably in combination therewith a danger signal which is automatically operated when the temperature rises above a predetermined set level. These also include a novel type of means to flood the container with fire inhibiting fluid in the event of stoppage of the air circulating means, causing non-circulation of air through the drying tumbler, which means is also thermostatically controlled to be only effective to flood the basket with fire inhibiting fluid when the temperature rises to a dangerous inflammable level, stopping of current being ineffective to release the flooding means if the temperature is below a safe predetermined level. This last device is also preferably constructed only to operate on a lasting failure of current and includes a device which will permit momentary interruptions in the current, permitting solenoid core means energized by the current to drop temporarily insufficient distances to actuate the flooding means so that they may be picked up by the solenoid means on the resumption of current after a temporary interruption.

Further features of my invention relate to the manner in which these improved safety devices are connected together to function in association with and to complement each other.

A further object of my invention, therefore, is to provide thermostatic means in the outlet duct, the only place in which there is any danger at any time of there ever being any explosive mixture, so that when the temperature in said outlet duct rises above a predetermined level it will (a) control the temperature of the air entering the tumbler, (b) indicate any danger by a signal, (c) positively prevent the opening of the door as long as the temperature is at a dangerous level, and (d) will permit the device operated on failure of current to function to flood the tumbler with a fire inhibiting fluid when the temperature rises to said dangerous level. It is thus apparent that the provision of thermostatic means at this danger point, controlled by the temperature of the air having contacted the garments and containing residual solvent, not only insures the regulation of the air to prevent an explosion, but also indicates danger and prevents any danger of the explosion reaching the outside of the container and insures the application of fire inhibiting fluid in the event of failure of current above a safe temperature level. It is apparent that with the control of these safety features, located at the only danger point, I have provided a device so controlled as to provide maximum efficiency yet adequate safety against explosion, and one which is preferably also provided with safe guards only effective if there is a real danger of explosion.

Further features of my invention relate to the structure of the various means and mechanism I have provided for carrying out the above purposes.

A further object of my invention is to provide a device which will meet all insurance and municipal safety requirements.

These and such other objects of my invention as may hereinafter appear will be best understood from a description of the accompanying drawings, which illustrate my invention applied to a machine for drying garments in the process of dry cleaning them to free them of residual hydrocarbon solvent, of the so-called tumbler or rotating basket type.

In the drawings, Fig. 1 is a perspective view of a dry cleaning drying tumbler constructed in accordance with my invention taken from the front thereof with the covers for the door latching device and instrument panel removed.

Fig. 9 is a diagrammatic view of the parts of the tumbler illustrating the control means therefor, showing the tumbler in perspective and with the control means spread out and shown in a single plane to diagrammatically illustrate the functioning thereof, with the door bolt of the tumbler in open position, cutting off the flow of the current to maintain all portions of the control device and the fan and tumbler motor in an inoperative position.

Figure 10:
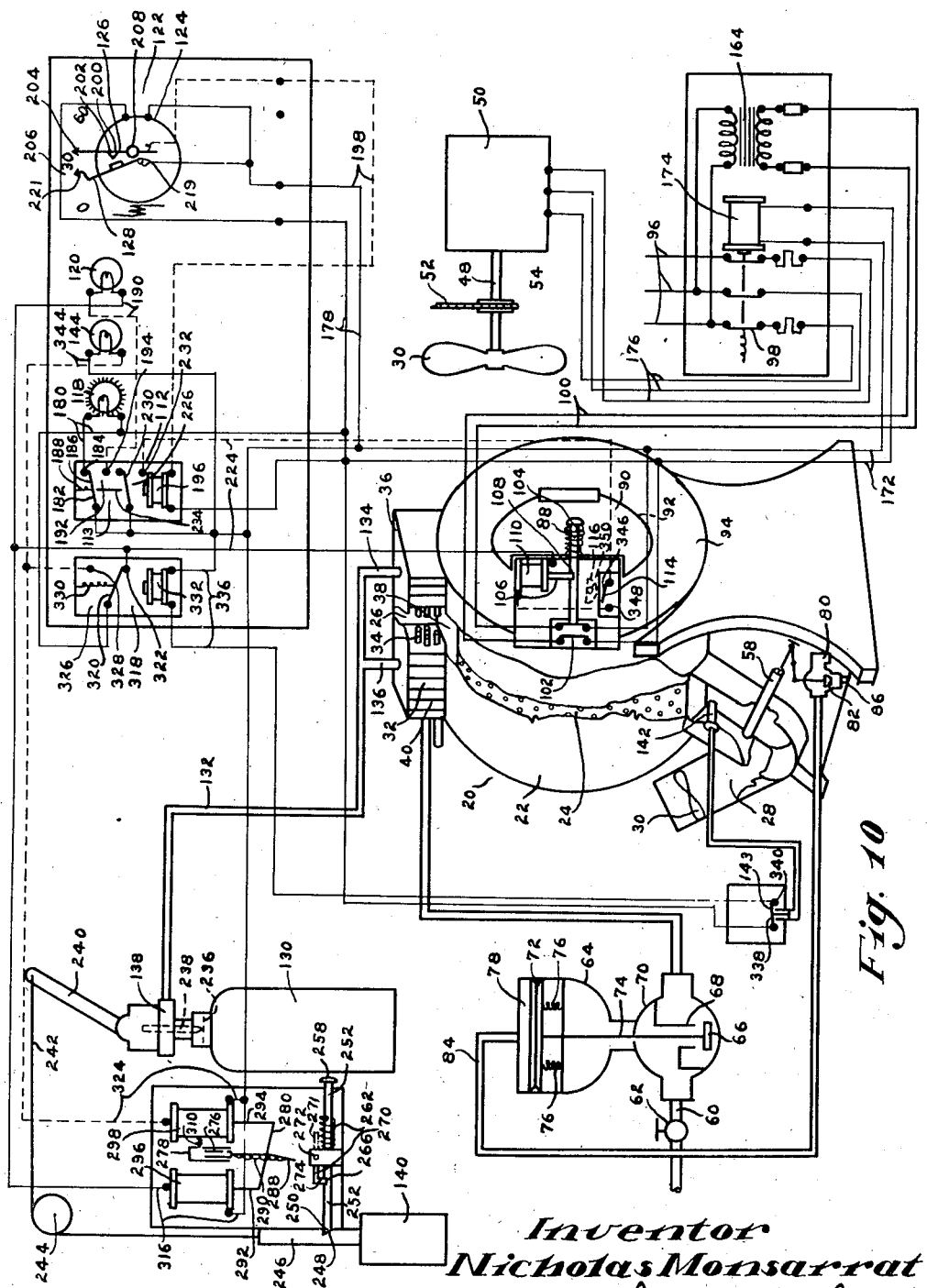

Fig. 10 is a diagrammatic view similar to Fig. 9 with the door bolt closed to start up the fan and tumbler motor, illustrating the tumbler in active tumbling operation at a suitable safe temperature as indicated by the energized "go" signal.

Fig. 11 is a diagrammatic view similar to Figs. 9 and 10 after the time controlled means has functioned to change the signals from "go" to "stop," indicating completion of the normal tumbling operation, and has cocked the means for releasing the door bolt latch.

Fig. 12 is a diagrammatic view similar to Figs. 9–11, illustrating the device when the temperature in the outlet duct has risen above a predetermined safe level, to actuate the danger signal, to render the means for releasing the fire inhibiting liquid on failure of current active and to positively prevent operation of the means for unlatching the door bolt, should this rise in temperature occur within the normal adjustable time interval of tumbling operation as evidenced by the also energized "go" signal, and illustrating in dotted lines the position certain of the parts assume when the device has functioned after a failure of current.

Fig. 13 is a diagrammatic view similar to Figs. 9–12, indicating how the device functions to achieve the same results set forth for Fig. 12 when the rise in temperature occurs after the normal adjustable time interval of tumbling operation.

In the drawings, wherein like characters of reference generally indicate like parts throughout, 20 generally indicates a suitable tumbling drying device for use in the dry cleaning of garments after they have been treated in a so-called washer with a suitable solvent and centrifuged to remove residual solvent therefrom prior to pressing them in a garment pressing machine. My improved method and apparatus for removing the residual solvent without danger of explosion may, however, in the broader aspects thereof, be employed for removing residual solvent from other materials than garments, and the apparatus itself may, if desired, be employed for any other drying purpose. I have illustrated in the drawings a tumbler 20 of the type typical in the prior art, which includes the casing or outer shell 22 usually constructed of sheet metal. The inner shell basket or container 24 for containing the garments or other materials to be dried is contained within the outer shell 22 and is agitated in any suitable manner, preferably being rotated, as shown. The container 24 is constructed of open mesh or preferably of perforate material as shown. Such a tumbler 20 is usually provided with duct means in its casing for passing drying air through said basket 24, including the inlet duct 26 to said basket and the outlet duct 28 from said basket, and suitable means are provided to circulate a current of drying air through said duct means 26 and 28 and basket 24, in the embodiment shown comprising a fan 30 in the outlet duct 28 rotated by means to be later described. Such types of tumblers are also provided with suitable means to preheat the drying air prior to passage through said basket 24, which in the embodiment shown, comprises heat exchanging apparatus 32, comprising the steam coils 34 passing in a sinuous course within said inlet duct 26. In the embodiment shown the heating coils 34 are provided with a suitable cover 36 forming the inlet chamber 26 between said cover 36 and a vent 38 leading from said inlet chamber or duct 26 to the basket 24. The side walls of said inlet duct or chamber 26 are provided with suitably spaced heat distributing fins or vanes 40 to guide the incoming air across said steam pipes 34 prior to passing downwards through the inlet vent 38 to the basket 24. It is apparent, however, that in place of the specific structure shown, insofar as the broader aspects of my invention are concerned, that any type of means may be provided to circulate air through the perforate basket 24 containing the materials to be dried, and any suitable means other than that shown may be provided for preheating said air. The basket 24 is suitably mounted on a shaft 42, mounted on a bearing 44 on the rear wall 46 of said tumbler, which is rotated in any suitable manner. In the embodiment shown, the fan 30 is mounted on the shaft 48 of the motor 50, and suitable intermeshing means from the motor shaft 48 drives the tumbler shaft 42, in the embodiment shown comprising a chain driven by a suitable driving gear 54 driven by the motor shaft 48 and driving a suitable gear 56 on the tumbler shaft 42. If desired, however, the means for rotating the tumbler and the means for driving the fan may be entirely independent of each other. As also stated, if desired the container may be suitably agitated in any suitable manner other than by rotating it, and insofar as certain broad aspects of my invention are concerned need not be moved.

In the prior art, the temperature of the steam pipes has been regulated by a suitable hand operated valve or complicated 2, 3 or 4 stage methods, with their necessary control apparatus, have been employed for suitably removing all traces of residual solvent. In controlling this transition from stage to stage in the drying or tumbling operation in certain prior art structures of which I am aware, it has been the practice to evaluate the temperature of the treated air in the inlet duct 26 and to control the temperature of the heat interchange apparatus 32 by the temperature of said incoming air. This has proven so inefficient that it has been necessary to use 3 or 4 cycles or stages in the drying method. In these prior art structures great care has been taken at least during the initial so-called danger period in keeping the temperature of the air entering the container below the flash point of the solvent employed.

I have discovered that the only danger of providing an explosive mixture is when the air actually contains cleaning solvent after contact with the garments or other materials being dried, and that due to the latent heat of evaporation of the amount of solvent normally present removed from the garments being treated by the circulating air that the temperature of the air after passage through the basket containing garments or container containing other materials, whether agitated or not, drops in the specific dry cleaning tumbling apparatus shown and hitherto described substantially 50° F. or 30° C. when employing a standard type of 138°–140° F. flash point hydrocarbon solvent on garments. I have thus found out that prior art tumblers controlled by the evaluation of the temperature of the air prior to contact with the garments have been operated at a much lower inefficient temperature than is necessary to prevent explosion. I have further discovered that if the temperature of the treated air leaving said basket, reduced by the latent heat of evaporation of cleaning solvent in said garments or other materials is evaluated and the preheating of the drying air controlled thereby that there will be no danger of explosion if this temperature, which, as stated, is usually 50° F. less than the temperature of the air entering the basket, is kept below the flash point of the inflammable hydrocarbon solvent. I have also discovered that with this higher permissible temperature of air entering the garments, approximately 50° F. higher than formerly thought necessary, the drying efficiency of the device is so improved that the device will dry the garments or other materials and remove the residual solvent without danger of explosion in a short single stage treatment, thereby eliminating the necessity for the complicated apparatus formerly required in automatically changing the stages of operation of the drying tumbler or other container in prior art structures. Thus, in my preferred embodiment I am able to provide a device of this simple structure with a single stage operation by evaluating the temperature of the air leaving the container, which is the only air which can contain the solvent and hence be explosive, preferably by suitable thermostatic means 58 in the outlet duct and controlling the temperature of the heating apparatus 32 for preheating the drying air by the changes in temperature of this air containing residual solvent in the outlet duct, thereby insuring that at the only possible danger point in or near the outlet duct, the temperature of the explosive mixture containing air and residual solvent, is maintained at a safe temperature not materially higher than the flash point of the solvent and hence below a predetermined inflammable level. I thus pass the heated air through the basket or container 24 for a suitable period of time in contact with the garments or other materials in the basket, I continuously evaluate the temperature of the treated air leaving said container or basket, reduced by the latent heat of evaporation of cleaning solvent in said materials in said container, and I constantly control the operation of the heat exchanging apparatus during said period of time to maintain the air leaving said container containing cleaning solvent after contact with said garments at a predetermined temperature not materially higher than the flash point of the solvent so as to maintain the temperature of the air having had contact with said materials below an inflammable explosive level.

As will be apparent later, the thermostatic means in the outlet duct 28 may not only control the amount of heat applied to the heat interchanging means 32, but may also control various safety features to be described. The means including said thermostatic means for controlling the amount of heat applied by the heat interchanging apparatus 32 may be of any suitable type, electrical or mechanical. In the embodiment shown, the steam coils 34 are provided with the inlet pipe 60. This inlet pipe 60 may be provided, if desired, with a manually controlled valve 62 for the manual control of steam applied to the heating coils 34. As stated hitherto, the means for controlling said heating means in accordance with the temperature in the outlet duct 26 includes the thermostat 58 which controls the regulator 64 for controlling the movement of a valve 66, which is thus indirectly thermostatically controlled. While any suitable type of means, mechanical, hydraulic or otherwise may be employed for controlling the valve 66 through the medium of the thermostat 58, I have shown in the drawings a diaphragm regulator 64 for regulating the valve 66 controlled by fluid pressure, which in turn is regulated by the thermostat 58. I have found this type of control more sensitive and satisfactory than other types. As shown in Figs. 9–13, the valve 66 is of the reverse acting type and is adapted to function against a valve seat 68 in the valve casing 70. The valve 66 is controlled by the diaphragm 72 in the regulator 64 which is attached to the valve 66 by the rod 74. The diaphragm 72 is normally urged to a position closing the valve 66 by the springs 76. A chamber 78 is provided at the upper end of the regulator having the diaphragm 72 as the lower wall thereof. A fluid line 80 has a control valve 82 therein and beyond it separates into two branches, namely the pressure branch 84 leading to the diaphragm chamber 78 and the outlet branch 86. The thermostat 58 located in the outlet duct 28 controls the valve 82. Normally the regulating fluid passes through the pipe 80 and through the pressure branch 84 to the diaphragm chamber 78, retaining the diaphragm 72 in a lowered position maintaining the valve 66 is open position permitting the flow of steam to the coils 34 through the inlet pipe 60. Thus when the temperature in the outlet duct 28 gets above a predetermined level, the thermostat 58 will expand, causing the valve 82 to shut off the flow of fluid from the branch 84 and cause it to pass through the outlet pipe 86. This will lower the pressure in the diaphragm chamber 78, permitting the springs 76 to raise the diaphragm 72 to lift the valve 66 to closed position, shutting off the ingress of steam through the inlet pipe 60 to the coils 34. When the temperature in the outlet duct 28 falls below said predetermined level, it is obvious that the thermostat 58 will contract, permitting the valve 82 to close, permitting the pressure in the inlet pipe 80 to pass through the branch pipe 84 into the diaphragm chamber 78 to lower the diaphragm 72 to lower the connected valve 66 to open position to permit steam to again flow through the inlet pipe 60 to the steam coils 34. It is apparent that this provides a sensitive type of thermostatic control which is rapidly sensitive to changes in temperature above the danger level.

As stated hitherto, my invention also includes various types of novel safety devices which are preferably employed in association with the principle of controlling the temperature of the air preheating means by the temperature of the air containing solvent after it has had contact with the garments or other materials being dried or extracted, although, if desired, any of the individual safety devices now to be described may be employed with any other type of control for the preheating means or even with a hand control or no control. To provide one of these safety devices, I provide means 88 movable to a position simultaneously latching the door 90 of the casing 22, pivotally mounted to cover a suitable entry and discharge hole 92 in the front wall 94 of the casing, in my preferred embodiment comprising the door bolt 88, said means being also capable of starting the functioning of the air circulating and basket moving means, in the embodiment shown comprising the motor 50 for simultaneously rotating the fan 30 and rotating the tumbler 24. In the embodiment shown, I employ a circuit 96 for actuating said motor 50 having a magnetic starting relay switch 98 therein. I also provide a main control circuit 100 for actuating said starting switch 98, having a switch 102 therein closed by said movable latching means or bolt 88. Said movable latching means or bolt 88 is normally urged to a free position breaking said circuit, in the embodiment shown by the spring 104, and hence stopping actuating of said air circulating and basket moving means or motor 50. I also provide means 106 for retaining said movable latching means or bolt 88 in latching position, in the embodiment shown comprising the solenoid actuated rod 106 adapted to fit into a suitable notch 108 in the slidable bolt 88. I also provide means for releasing said latching means retaining means or solenoid actuated rod 106, in the embodiment shown comprising the solenoid 110. Suitable means are provided for actuating said means for releasing said latching means retaining means, in my preferred embodiment comprising the normally open relay 112. I also provide externally operated means for controlling the functioning of said releasing means, in my preferred embodiment comprising an externally manually operated safety switch 114 actuated by the cam 116. In the embodiment shown the means 112 for releasing said latching means retaining means, namely the relay 112, is controlled by a time controlled switch later to be described, although it is apparent that other suitable types of means actuated by timer means may be employed for this purpose, said means being settable for adjustably variable time controlled intervals of operation of said timer means and hence tumbler. It is thus obvious that with this construction the door 90 is positively retained in closed position by the rod 106 retaining the bolt 88 in closed position until the termination of the time controlled period, when on the operation of the manually controlled means 114, the means for releasing said latching means is permitted to open, permitting opening of said door 90 only after the end of said time controlled period.

I also provide a signal indicating normal operating or "go" movement of said basket, in my preferred embodiment comprising a yellow light 118 and a signal indicating completion of said proper time interval of tumbling and hence time for removal of the garments from said basket 24, comprising an "end" signal or green light 120, indicating completion of the desired time interval of the basket movement, said yellow and green lights 118 and 120 respectively being suitably actuated by the control circuit 100 and suitable means to be described for switching signals, in my preferred embodiment comprising the combination relay 113 functioning doubly as a relay for the circuits of each of said lights.

I also employ timer means 122, in my preferred embodiment, comprising an electric clock 122 driven by the single phase synchronous motor 124, and I employ means including means controlled by said timer means settable for adjustably variable time controlled intervals of operation of said means for changing said signals, and also, as stated, for actuating said means for releasing the retaining means for the solenoid rod 106 for the door latching means or bolt 88, in my preferred embodiment comprising the time controlled switch 126 having a member 128 moved to closed position by said timer means or time clock 122, adjustably settable to regulate the time interval of tumbling, in my preferred embodiment to regulate the time interval of inaction of the relay 112 for acuating the solenoid 110 and the combination relay 113 for switching the signals 118 and 120, after bolting said door 90 to start said motor means 50.

Another safety feature of my invention comprises the means I preferably employ for flooding said basket 24 and connected duct means with fire inhibiting fluid. Any suitable type of fire inhibiting fluid may be employed in the specific invention shown and claimed by me, but I preferably employ for this purpose liquid carbon dioxide ($CO_2$), which changes into a gas to positively prevent combustion. While I am aware that others have used steam and other types of gas for this purpose, I believe the use of gaseous carbon dioxide ($CO_2$) is superior, due to the fact that it has no injurious effect on the garments being treated, and for this purpose I provide the liquid carbon dioxide container or carboy 130, having a pipe 132 leading to the upper portion of the inlet chamber 26, preferably terminating in two pipes 134 and 136, discharging respectively at the front and rear of said inlet chamber 26, said pipe 132 having a valve 138 therein. I also provide means to release said flooding means on failure of actuation of said air circulating means or fan 30, in my preferred embodiment on a failure of electric current, and including normally inactive electrical control means for this purpose, comprising a suitable weight 140, for opening said valve 138, normally retained in a raised latched position by suitable means to be described, and I provide means including thermostatic means 142 in said outlet duct 28 operable only to permit operation of said flooding means releasing means when the temperature rises above a predetermined level, in my preferred embodiment comprising a thermostatically controlled switch 143 operable only above a predetermined temperature in said outlet duct 28 to render said electric control means active. In my preferred embodiment said thermostat controlled means 143 also supplementally functions to prevent actuation of the releasing means for the retaining means for the door latching means when the temperature rises above a predetermined level, and to further complement the signal means hitherto described, I provide signal means comprising the red light 144 actuated by said thermostatically controlled means 143 for indicating rise of temperature above said predetermined level. Thus in the specific embodiment shown said thermostatic means 142 in said outlet duct 28 becomes operable above said predetermined temperature level therein to render the control means for the flooding means active on a failure of current, to additionally actuate said danger signal or red light 144 and to positively disconnect said latching means retaining rod solenoid 110.

It is thus obvious that my invention includes five safety features, namely (1) that it is impossible to start the means for rotating the air circulating means 30 and moving the tumbler 24 until the door 90 is bolted; (2) an important safety feature which positively prevents again opening the door until the temperature in the outlet duct is below a predetermined positively non-explosive level; (3) a switch operated by a time clock in association with a latching device for the door bolt which will positively prevent release of the door bolt to open the door until the basket has been agitated a sufficient period of time to remove the solvent therefrom, which, as stated, in (2) is positively prevented from operating to permit withdrawal of the door bolt when the temperature rises above a predetermined safety level; (4) a safety signal system which will denote operation of the tumbler after the door is closed for an adjustable predetermined period of time, which at the completion of said period of time automatically switches signals to indicate completion of the normal tumbling operation and that it is safe to open the door and preferably in combination therewith a danger signal which is automatically operated when the temperature in the outlet duct rises above a predetermined set level; (5) a novel type of means to flood the container with fire inhibiting fluid in the event of stoppage of the air circulating means which is also only effective to flood the basket with fire inhibiting fluid when the temperature rises to a dangerous inflammable level, stoppage of air circulating means being ineffective to release the fire inhibiting fluid if the temperature is below a safe predetermined level, which device is constructed to operate only on a lasting failure of current.

Thus, as stated, I provide thermostatic means in the outlet duct not only to control the temperature of the preheating means for the air circulating through the materials but also to control various safety features. Thus in my preferred embodiment suitable thermostatic means in the outlet duct (1) regulates the preheating means for the circulating air; (2) renders the operation of the safety flooding means for the drying apparatus operative on failure of current above a predetermined dangerous temperature level; (3) lights a danger signal when the temperature in the outlet duct rises above said predetermined level; and (4) positively prevents the opening of the door bolt to render it impossible to open the door when the temperature is above a predetermined level.

The aforementioned safety features or any combination of one or more thereof with or without the improved thermostatic control in the outlet duct for controlling the preheating of the air may be constructed in any manner of electrical or mechanical elements or both or otherwise. If desired a single thermostatic means in the outlet duct for accomplishing one or more of these results may be provided, but in my preferred embodiment I preferably provide electrical means for actuating all of said devices, including an electric switch in a control circuit controlled by said thermostatic means, which may or may not be a different thermostatic means from that employed to regulate the preheating means, in the embodiment shown comprising a separate thermostat 142.

Figure 6:
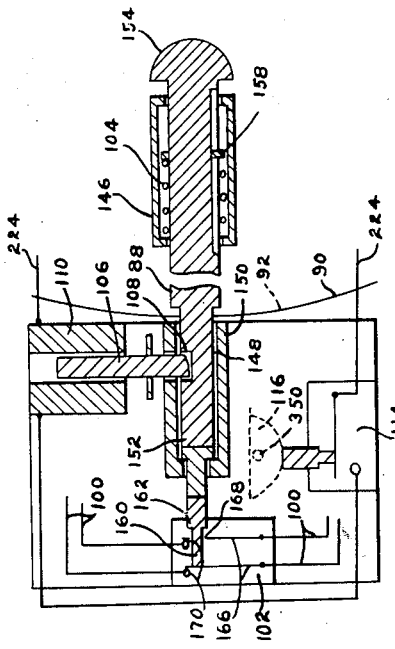
Fig. 6 is a transverse vertical sectional view taken approximately centrally of the parts of the elements of the door latching mechanism shown in Fig. 5.
Figure 8:
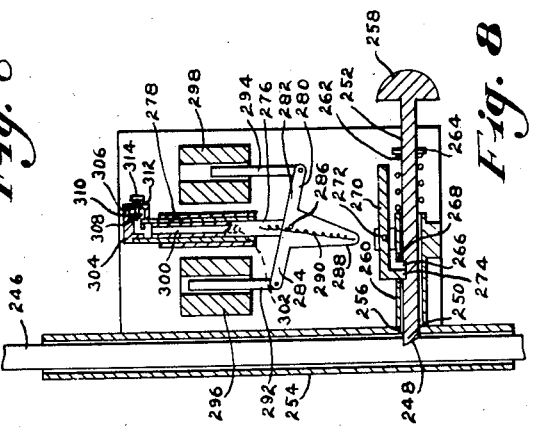
Fig. 8 is a transverse vertical sectional view taken through the elements of the tiltable latch shown in Fig. 7 approximately centrally thereof.
Figure 5:
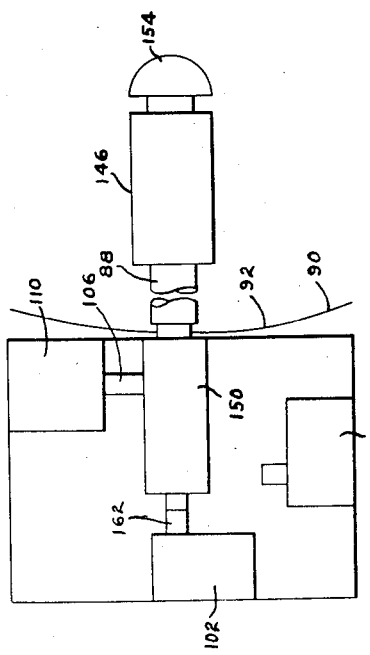
Fig. 5 is an enlarged detail front elevation of the elements of the door latching mechanism I preferably employ.

I will now proceed to a description of the specific electrical system I employ for actuating the various types of safety controls hitherto described. I have shown in Figs. 5 and 6 the specific construction of the safety features I preferably employ in association with the door bolt. The door bolt 88 is suitably mounted to slide in a casing 146 suitably attached to the front of the door 90 in alignment with an axial hole or socket 148 in a casing 150, suitably mounted on the front wall 94 of the container adjacent the inner end 152 of the bolt 88. The outer end of the bolt 88 is provided with a suitable enlarged push button 154. As stated, I provide means for normally urging said bolt to open position. In my preferred embodiment for this purpose the interior of the casing 146 is enlarged to receive a spring 104 which has the inner end abutting the inner end of the enlarged casing 146 and the outer end abutting a suitable annular flange 158 on the bolt 88. The inner end 152 of said bolt is extended into a narrow tip 160 having a shoulder 162 spaced from the inner end thereof. As stated, the main control circuit 100 is suitably connected to the source of electric supply 96, in the embodiment shown having a transformer 164 intermediate the source 96 and the control circuit 100 to reduce the voltage in the control circuit if this be desired. The control circuit 100 passes adjacent the inner end 162 of said bolt and has preferably a double pole switch 102 therein in or adjacent the bolt socket 148, closed by said bolt when moved to a position locking said door. In the embodiment shown said switch 102 comprises the two movable contacts 166 and the stationary contacts 170. The tip 160 of the bolt 88 is suitably insulated from the metal of the bolt itself, in the embodiment shown by being separate from the bolt and constructed of insulating material. The inner end of said tip 160 is adapted to abut the inner movable contact 166 to urge it against a stationary contact 170 and is also adapted to pass through a hole 168 in the outer movable contact 166 until the shoulder 162 thereof abuts said movable contact to cause it to supplementally contact the other stationary contact 170, thus completing the circuit through the main control circuit 100.

I also provide a motor switch actuating circuit 172 connected to and actuated by said main control circuit 100 having a relay coil 174 therein for actuating said motor line relay switch 98 to operatively connect the motor circuit 176 to the motor 50 only when the door 90 is bolted by the bolt 88. I have shown in the drawings a connection for a three phase motor, although it is obvious that any suitable type of motor may be employed. As stated, I provide a latch 106 for holding said door bolt 88 in latched position, said door bolt 88 being provided with a suitable notch 108 for receiving the latch 106 therein. As also stated, said latch 106 comprises a rod actuated by the core of a solenoid 110, which is suitably actuated in a manner later to be described.

Figure 1:
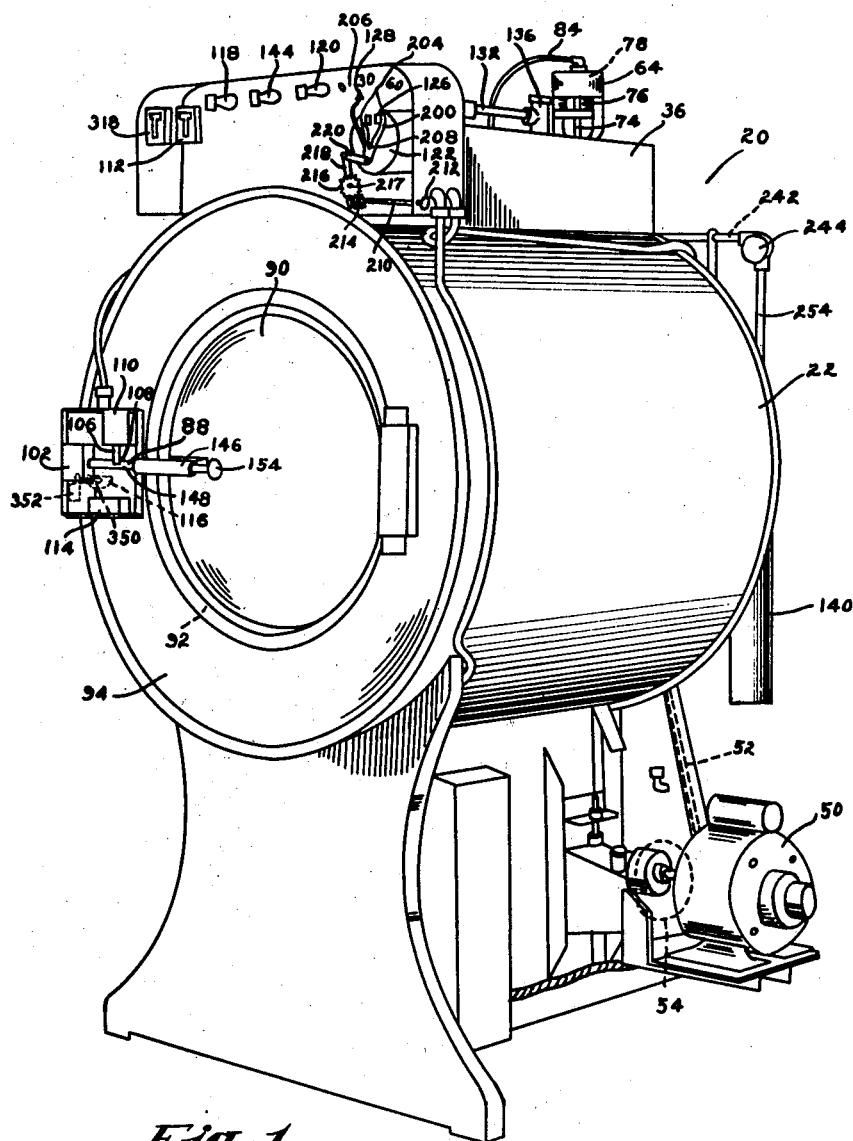
Figure 2:
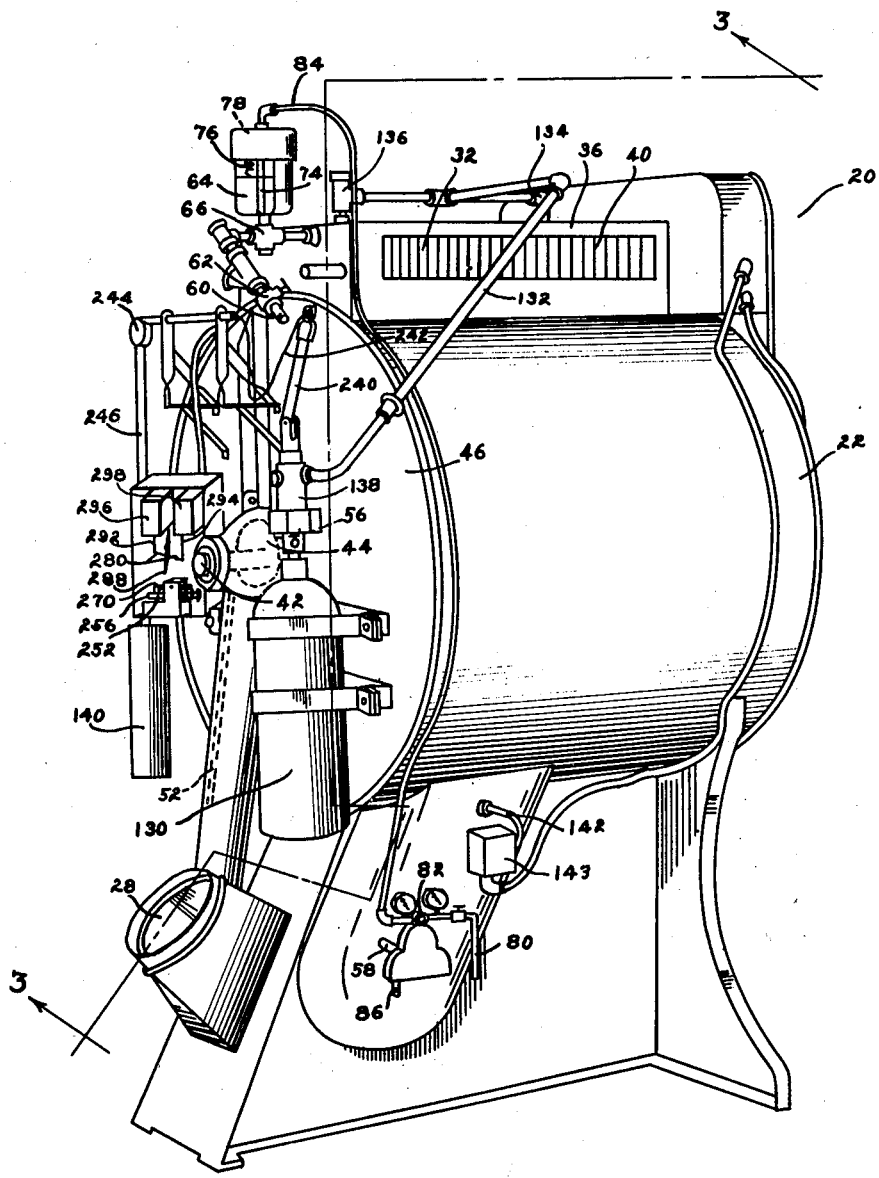
Fig. 2 is a perspective view of the dry cleaning drying tumbler shown in Fig. 1 taken from the rear thereof at approximately 180° from the line of vision of Fig. 1, with the cover for the trip latch removed.
Figure 3:
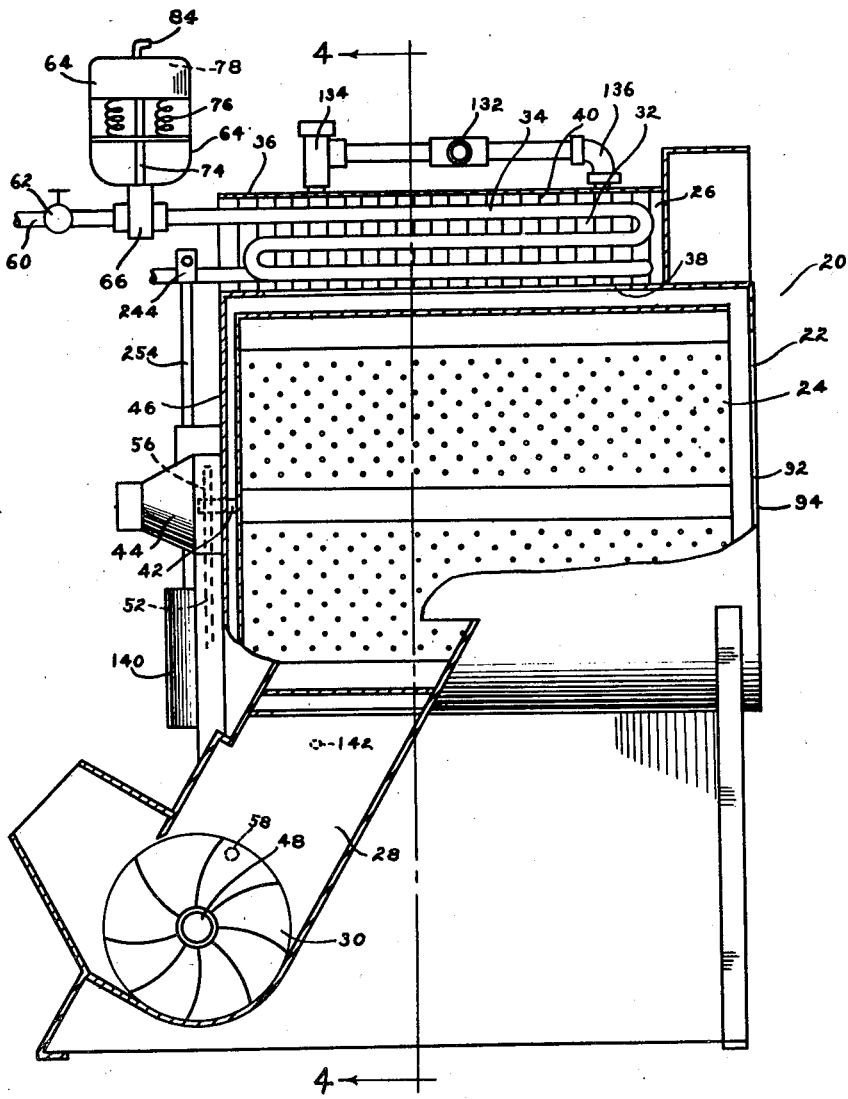
Fig. 3 is a vertical longitudinal sectional view taken through the tumbler shown in Figs. 1 and 2 along the line 3—3 of Fig. 2.
Figure 4:
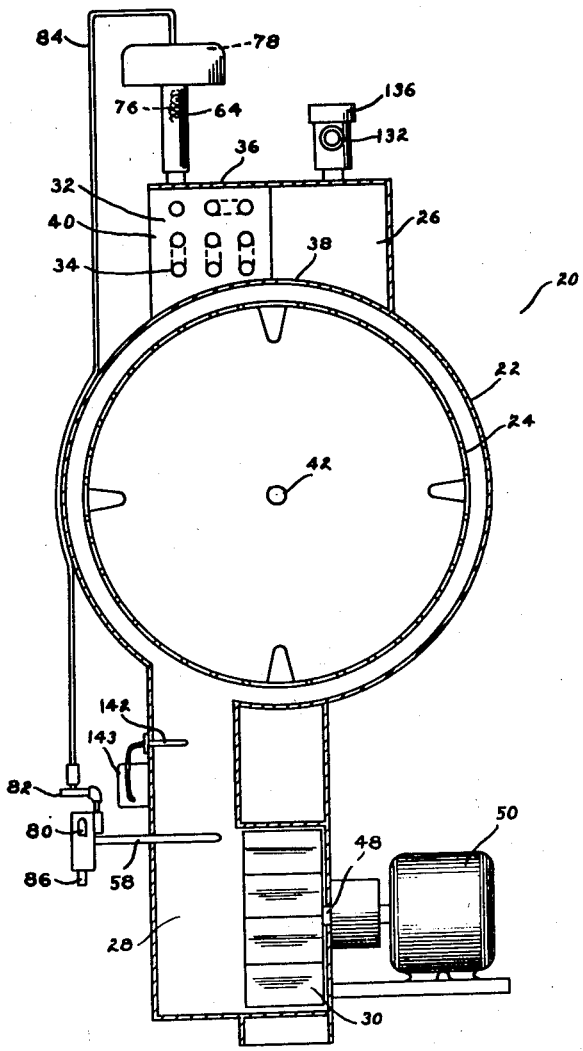
Fig. 4 is a transverse vertical sectional view taken along the line 4—4 of Fig. 3.

As previously stated, I also provide a signaling system and to actuate the solenoid 110 to release the latch 106 and to actuate the signaling system I provide the circuits now to be described. As stated, I provide an electric timer clock 122 driven by a single phase synchronous motor 124. The single phase synchronous motor for the timer clock 122 is suitably driven by the circuit 178 connected to said main control circuit 100. As stated, I provide the "go" signal 118 comprising a yellow electric lamp indicating normal tumbling operation, and a circuit 180 for said "go" signal connected to said main control circuit having a relay switch 182 therein, comprising a stationary contact 184 and the movable switch contact 186. The movable contact 186 is provided with suitable means, such as the spring 188, to normally urge it to signaling position during the time interval of tumbling operation. I also provide an "end" signal, in the embodiment shown comprising the green lamp 120 indicating completion of the desired time interval of tumbling operation and a circuit 190 for said "end" signal having a relay switch 192 therein movable to signaling position at the completion of tumbling operation, comprising a stationary contact 194 and the movable relay switch contact 186, it being obvious that in the embodiment shown the movable relay switch blade 186 functions alternately as a double pole alternative relay switch blade for the respective "go" and "end" signal circuits 180 and 190. I also provide the relay coil 196 for simultaneously actuating the movable blade 186 of the relay switches 182 and 192 in each respective signal circuit 180 and 190 to simultaneously de-energize the "go" signal circuit 180 extinguishing the yellow light 118 and energizing the "end" signal circuit 190 lighting the green light 120. I also provide a circuit 198 connected to the main control circuit 100 for actuating said signal relay coil 196 having a switch 126 therein including a blade 128 movable by said timer clock 122 to closed position after a predetermined adjustable time interval of timer clock operation, and I provide means for setting said switch to operate on completion of different adjustable time intervals. In my preferred embodiment said switch 126 includes a settable member 200 having a stationary contact 202 mounted thereon. Said member 200 terminates in the pointed end 204 adjustable over a suitable time scale 206 mounted above the time clock 122. Said settable member 200 is suitably pivotally mounted as at 208 in front of the time clock. While any suitable means may be provided for adjusting the member 200, in the preferred embodiment it is preferably adjusted as follows as shown in Fig. 1: a shaft 210 projects laterally of the time clock and terminates in an end having a turning handle 212 thereon. The inner end of said shaft 210 has a worm 214 mounted thereon which drives a worm gear 216. An arm 218 projects radially outwardly from the shaft 217 on which said worm gear 216 is mounted, and a link 220 is pivotally connected to the lower end of said member 200 and to the outer end of said radial arm 218. The switch 126 also includes the movable contact member 128 which projects radially from the main drive shaft 219 of the timer clock 122 so as to be rotated thereby and terminates in an outer bent pointed end 221 which travels over the time scale 206 and completes the circuit 198, energizing the solenoid 196 on contact with the set stationary contact 202 thereof on the adjustable arm 200 to actuate the switch blade 186 against the pressure of the spring 188 to move the blade from the stationary switch contact 184 of the "go" circuit 180 to the stationary switch contact 194 of the "end" circuit 190. It is thus obvious that in the embodiment shown, while I have in effect provided two relays for respectively energizing and de-energizing simultaneously the circuits 180 and 190, I have employed for this purpose the solenoid 196 actuating the single movable blade 186, said blade thus being common to the combined relay 113 functioning as a single relay for each of said respective light circuits 180 and 190.

I also provide a circuit 224 connected to the main control circuit 100 for actuating said solenoid 110 having a relay switch 226 therein forming part of a suitable relay 112 for this purpose. Said relay switch includes the movable blade 230 and the stationary contact 232 interposed in said circuit 224. While a separate relay solenoid may be provided if desired, I preferably connect the movable blade 230 of the relay 112 in tandem with the movable plate 186 by the rod 234 to function doubly as a relay for the light circuit 180 and also as a relay for the light circuit 190 and having a common movable switch blade 186 by connecting said switch blade 230 by the rod 234 to said common switch blade 186 to move therewith so that all three relays may be actuated by the single solenoid 196 interposed in the time controlled circuit 198 and actuated by the timer controlled switch 126 thus providing a double pole, double throw switch actuated by a single solenoid or relay. It is thus obvious that with this construction, on the actuation of the solenoid 196 by the timer controlled switch 126, that the yellow light 118 will be switched off and the green light 120 turned on at the same time the circuit 224 is energized up to the switch 114, externally operated in the manner previously explained. On actuation of said switch 114, the circuit 224 is completed to actuate the solenoid 110 and the actuated solenoid 110 will function to draw the solenoid rod 106 out of its notch 108, permitting the spring 104 to withdraw the bolt 88 from its socket 148 so that the door 90 may only be opened after the completion of the adjustably set time controlled period for tumbler operation.

I will now describe in more detail the specific type of means I employ for flooding said casing 22 with the fire inhibiting fluid on occurrence of a temperature within said outlet duct 28 above a predetermined level. As previously set forth, said means includes a container or carboy 130 having a normally closed discharge valve 138 therein. The valve 138 may be of any desired type, but in the preferred embodiment comprises a suitable cutter valve which includes a diaphragm 236 for the container and a suitable cutter blade 238 actuated by the arm 240 of the valve 138 in any suitable manner to cause the cutter blade 238 to perforate the diaphragm 236. The end of the arm 240 is suitably connected by the chain 242 passing over the pulley 244 to the rod 246 projecting upwardly from the weight 140. The rod 246 has a suitable latching pin socket 248 therein to receive the end 250 of the latching pin 252. A rigidly vertically mounted sleeve 254 is provided for vertical reciprocation of the rod 246 therein having a hole 256 therein for receiving the end 250 of the latching pin 252 therein when in alignment with the rod socket 248. The latching pin 252, as stated, is movable to a position having the end 250 thereof contained in said socket 248 for retaining said weight 140 in raised inoperative position.

Figure 7:
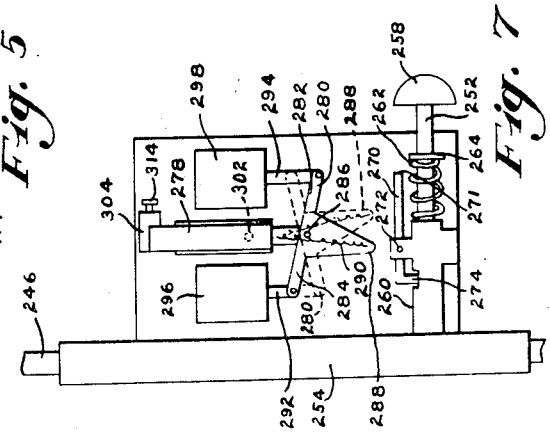
Fig. 7 is an enlarged rear elevation of the elements of the tilting latch I preferably employ to render the means for flooding the casing with fire inhibiting fluid tiltable to be rendered active as indicated in dotted lines on occurrence of a temperature within the outlet duct above a predetermined level.

The outer end of the latching pin terminates in the push button 258, and a horizontally mounted guide sleeve 260 for said latching pin rigidly mounted on said machine is also provided to permit horizontal slidable movement of the guide pin 252 into and away from said socket 248. Means are provided for urging said latching pin 252 out of its socket 248, in the embodiment shown comprising the helical spring 262 surrounding said latching pin, having the inner end thereof abutting the outer end of said stationary sleeve 260 and the outer end thereof abutting an annular flange 264 on said latching pin. The latching pin 252 is also provided with a latch socket 266 on the upper surface thereof in alignment with a suitable hole 268 in said sleeve 260. It is thus obvious that the spring 262 normally urges the latching pin 252 out of engagement with the socket 248, but when the push button 258 pushes the end 250 of the latching pin 252 within the socket 248, the latch socket 266 will be brought into alignment with the latch hole 268 in the sleeve 260. I also provide the latch 270 pivotally mounted on said sleeve as at 272 having a projection 274 at the inner end thereof weighted to normally project downwardly through the hole 268 in the sleeve 260 and into the aligned latch socket 266 in the latching pin 252 to retain the latching pin 252 in latched position with the end 250 thereof contained in the socket 248. I provide a rocker plunger 276 suitably slidable in a sleeve 278 rigidly vertically mounted on the latch casing. A trip rocker 280 comprising a lever of the first class, having an arm 282 projecting outwardly therefrom and an arm 284 projecting inwardly therefrom substantially in a horizontal plane is centrally pivotally mounted as at 286 as by the pivot pin 286 on the lower end of the rocker plunger 276. Said trip rocker also has a projection 288 projecting downwardly centrally thereof adapted to selectively abut the latch 270 in the manner to be explained, either at a neutral position above its pivot 272 or in a position outwardly of said pivot 272 to pivot the latch projection 274 out of register with its latch socket 266. A spring 290 connects the lower end of said projection 288 with the rocker plunger 276 so as to normally retain the projection 288 in an off center position to drop to said neutral position over the pivot 272 or to a position abutting the outer end of the latch 270 to release it. The trip rocker 280 is positively moved to said opposite positions in a manner to be explained. A solenoid actuated rod 292 is pivotally connected to the inner end of said inner arm 284 of the trip rocker 280, and a solenoid actuated rod 294 is pivotally connected to the outer end of the outer arm 282 of the trip rocker. I provide a low temperature solenoid 296 located to the left of rocker plunger 276 in Fig. 7, adapted on the energization thereof to raise the solenoid rod 292 to positively pivot said trip rocker so that the lower end 288 thereof will drop in said neutral position above the pivot 272 on failure of electric current, being retained in said position by the off center spring 290, and I also provide a high temperature solenoid 298 adapted on the energization thereof to raise the solenoid actuated rod 294 connected to the outer end of the outer arm 286 of the trip rocker 280 to pivot the trip rocker to the dotted line position shown in Fig. 7 to cause the lower end 288 thereof to drop on failure of electric current to abut the free outer arm 271 of said latch 270 to pivot it to raise the projection 274 out of its latch socket 266 to permit the spring 262 to urge the latching pin 252 outwards from said latch socket 248, thus releasing said weight 140 to actuate the cutter blade in the valve 138 to open said fire inhibiting fluid discharge valve 138 to cause the fire inhibiting fluid to flow through the pipe 132 to be discharged downwardly through the pipes 134 and 136 into the interior of the container 22, thereby flooding the basket 24 and its adjacent inlet and outlet ducts 26 and 28 and the garments and other materials contained within said basket with fire inhibiting fluid. I also preferably provide an air check associated with said trip rocker latching means to cause the trip rocker 280 and plunger 276 to drop so slowly on momentary current interruptions that before they have dropped sufficiently to abut the latch 270, the respective solenoid 296 or 298 is again energized to raise the trip rocker 280 to an unlatching position. For this purpose I preferably construct the sleeve 278 in the form of an air check cylinder and I provide the rocker plunger 276 with a longitudinal vent 300 extending from near the lower end thereof to the upper portion thereof. To permit the slow dropping of said plunger 276, an air vent 302 is provided near the lower end of said cylinder 278 and said cylinder is provided with a suitable cap 304 to make it into a cylinder having an adjustable reducing valve therein. Said valve may include a passage 306 having a conical valve seat 308 therein. A cooperating valve head 310 is adjustably mounted on the inner end of a set screw 312 having a turning handle 314 at the outer end thereof mounted on the wall of said cylinder 278 near the upper end thereof above the upper movement of the plunger 276. By adjustment of the set screw 312 the leakage through the cooperating valve and valve seat 310 and 308 respectively may be readily adjusted to regulate the time interval of dropping of the plunger 276 and its connected trip rocker 280. Thus in use the plunger 276 and trip rocker 280 will drop slowly, depending on adjustment of the valve 310, until the longitudinal vent 300 in said plunger comes below the lower end of said plunger cylinder 278 when the plunger 276 and trip rocker 280 will drop rapidly either to the neutral or to the unlatching position hitherto described as air may pass rapidly through said air vent 302 and out through said longitudinal vent 300. This addition of an adjustable air check cylinder I believe is novel in devices of this description, for it provides a device which may only be actuated on a real interruption of current and which will not function on momentary current interruptions.

I also provide a circuit 316 connected to the main control circuit 100 for actuating the low temperature solenoid 296 having a normally closed relay switch 318 therein comprising a movable switch blade 320 and a stationary contact 322. I also provide a circuit 324 connected to said main control circuit 100 for actuating said high temperature solenoid 298 having a normally open relay switch 326 therein comprising said movable blade 320 and a stationary contact 328. It is thus obvious that in the embodiment shown that the same movable relay switch blade 320 performs the function of the movable switch blade for the relay switch 318 for the low temperature solenoid circuit 316 and for the relay switch 326 for the high temperature solenoid circuit 324, thus making a single relay switch blade perform the same function in two relay switches. The spring 330 normally urges the movable switch blade 320 to a position contacting the stationary contact 328 completing the high temperature solenoid circuit 324. I provide a suitable relay coil 332 for simultaneously moving the common movable switch blade 320 to actuate the relay switch 318 to disconnect the low temperature solenoid circuit 316 and the relay switch 326 to connect the high temperature solenoid circuit 324.

As stated, I provide the thermostat 142 mounted in said outlet duct 28. I also provide a switch 143 movable by said thermostat to open position when the temperature rises above a predetermined level in said outlet duct. I also provide the relay coil circuit 336 for said solenoid 332 connected to said main control circuit 100 having said normally closed thermostatic switch 143 therein. Said switch 143 includes the movable contact 338 and the fixed contact 340. The movable contact 338 may be moved to broken open position in any suitable manner such as by the expansible liquid in the thermostat 142 when the temperature in the outlet duct rises above a predetermined level.

I also provide, as stated, a danger signal, in the embodiment shown a red lamp 144 and a circuit 344 for said danger signal connected to said control circuit 100 in series with said high temperature solenoid circuit 324 so as to be energized simultaneously therewith to light the danger lamp 144 when the circuit 336 containing the solenoid 332 is broken by rise of temperature in said outlet duct causing the thermostat 142 to break the switch 143 to de-energize the common relay solenoid 332, permitting the spring 330 to raise the solenoid switch blade 320 to break the low temperature solenoid relay 318 and on resulting de-energization of said low temperature solenoid circuit 316 to actuate the high temperature solenoid relay 326 connecting in said high temperature solenoid circuit 324 and danger light circuit 344.

The circuit 224 for actuating said door bolt latch solenoid 110 is connected to the main control circuit 100 in series with said low temperature solenoid circuit 316 so that it will be automatically rendered inoperative on de-energization of said low temperature solenoid circuit 316 by said thermostatically controlled relay switch 318 energized by the solenoid 332 in the solenoid circuit 336 controlled by the thermostatically controlled switch 143 in the manner hitherto explained. As stated, said circuit 224 also has the switch 114 therein, manually controlled from exterior of said casing to close said circuit 224 to actuate said solenoid 110 to release said door bolt latch 106 to permit opening of said door 90 only after completion of the normal tumbling operation as designated by said end signal 120, it also being apparent that the switch 102 is simultaneously opened which stops said motor 50, stopping the fan 30 and tumbler 24. In the embodiment shown the switch 114 comprises the movable switch contact blade 346 and a stationary contact 348. The cam 116 is arranged to depress the movable blade 346 against the stationary contact 348 to complete the circuit 224 operating switch 114 to energize the solenoid 110 to withdraw the latch 106. The cam 116 is mounted on a shaft 350 extending through the door having a handle 352 on the outer end thereof so as to be readily manually operable from exterior of the casing. Thus in order to complete the circuit 224 to open the door it is necessary that the time controlled switch 126 should have closed, lighting the green light, signifying completion of normal tumbling operation, and it is necessary that the low temperature solenoid circuit 316 be energized in order for the casing to be at a safe and non-explosive temperature when opening the door, and even then it is impossible to open the door until the cam 116 has been rotated in the manner explained by the handle 352 to complete the circuit 224 to energize the solenoid 110 to raise the latching pin 106 out of contact with the door bolt 88. For simplicity of the drawings I have shown all the various circuits hitherto described connected to the main control circuit 100 by many common wires, designating the circuits near the parts controlled thereby by their proper reference characters, and it is apparent that most of the circuits are conjointly connected to the main circuit 100 by the various common wires shown.

In operation, after my improved drying device has had the inlet pipe 60 suitably connected to the source of steam, and the power lines 96 suitable connected and the device otherwise set up in the manner described, the tumbler is now ready to be put into operation. The first step is to open the manually operated steam supply valve 62 which will let the steam bias the thermostatically controlled valve 66 at the top of the heating apparatus 32. As the thermostatically controlled valve 66 is a reverse acting valve controlled from the outlet duct 28, it will remain open until the air passing through the outlet duct 28 reaches the maximum temperature of 138° F., when in the manner explained the pressure will be bypassed through the line 86 to reduce the pressure against the diaphragm 72 to permit the spring 76 to rise to close the valve 66 to shut off the steam entering the coils 34 as shown in Figs. 12 and 13. I have shown in Fig. 9 the position the parts assume at this stage. The next step is to latch the door 90 by adjusting the door bolt 88 within its socket 148, causing the inner end 152 thereof to close the switch 102 in the manner hitherto explained when the rod 106 will drop to move into notch 108 to retain the door bolt in a latched position. This will complete the control circuit 100 and energize the motor switch circuit 172 and energize the solenoid 174 to attract the switch blade 98 to complete the circuit in the motor circuit 176 to start the motor 50, which in the embodiment shown simultaneously starts rotation of the fan 30 and basket 24 in the manner hitherto described. The timer switch 126 is then set by moving the settable member 200 by rotating the turning knob 212 in a counter clock wise direction until the pointer 204 indicates the time cycle of 10 minutes on the scale 206. This will allow the tumbler to be warmed up and ready to receive the garments to be tumbled. The door 90 is then opened, the garments inserted in the basket 24, the door 90 closed and the bolt 88 again latched into position in its socket 148 closing the switch 102 and permitting the latching pin 106 to slide into position into its notch 108, retaining the bolt 88 in locked position and moving the cam 116 through the medium of its external handle to close the switch 114 to complete the circuit 224 to the solenoid 110 thus starting the operation of the motor and fan in the manner just described. The pointer 204 of the time controlled switch may then be adjustably set in the desired manner for the desired period of tumbling operation. Fig. 10 diagrammatically illustrates what happens during this stage. The timer circuit 178 is energized to operate the timer 122. The switch 143 is closed, permitting the thermostatically controlled solenoid circuit 336 to energize the solenoid 332 to permit the common switch blade 320 to swing against the pressure of the spring 330 to the position shown, energizing the low temperature solenoid circuit 316. As the time controlled circuit 198 has not yet been energized by the time controlled switch 126, the spring 188 will pull the common switch blade 186 and switch blade 226, the blade 226 to a neutral position and the common switch blade 186 to a position contacting the contact 184 to energize the "go" light circuit 180, lighting the yellow lamp 118.

The air flow during the period of normal tumbling operation is held below 138° F. if 138° flash point solvent is employed, and the yellow light 118 continues to be lighted during this period of normal tumbling operation. At the conclusion of this period of normal tumbling operation, the timer 122 operates the movable contact blade 128 until it contacts the stationary contact 202 on the settable arm 200 when the circuit 198 operated on closing of the time switch 126 becomes effective to energize the solenoid 196 pulling the contact blade 226 down to the stationary contact 228 to complete the circuit 224 for energizing the door latch solenoid 110 unless it otherwise be broken and the common switch blade 186 downwards to energize the circuit 190 for lighting the green "end" light 120, and as it is simultaneously removed from the fixed contact 184 it will break the circuit 180, shutting off the yellow "go" light 118. Inasmuch as the door bolt 88 is still in position closing the switch 102, the motor switch circuit 172 continues to close the switch 98 to complete the motor circuit 176 to energize the motor 50 to continue to rotate the fan 30 and rotate the tumbler 24. Fig. 11 diagrammatically illustrates what happens during this stage.

When it is desired to open the door 90, the handle 352 is turned, causing the cam 116 to close the switch 114 to energize the solenoid circuit 224 to energize the solenoid 110 to lift the solenoid actuated rod or latch 106 out of contact with its socket 108 permitting the spring 104 to withdraw the bolt 88 from its socket 148. This also causes the spring blades 166 of the switch 102 to pivot to open position, breaking the main control circuit 100, causing de-energization of the solenoid 174 and causing cessation of rotation of the basket 24 the parts resuming the positions shown in Fig. 9. The time clock 122 is constructed to automatically return to zero and the light 120 will automatically go out as the control circuit 100 is broken.

Figs. 12 and 13 indicate what happens if the temperature of the air flowing through the outlet duct 28 exceeds 138° F. or any other set temperature during the operation of the tumbler. Should this event take place, the thermostat 142 breaks the switch 143 in the manner hitherto explained, de-energizing the thermostatically controlled solenoid circuit 336 and causing the spring 330 to raise the switch blade 326 to a position breaking the low temperature solenoid circuit 316 and energizing the high temperature solenoid circuit 324, and simultaneously energizing the red light circuit 344. Inasmuch as the latch releasing solenoid circuit 224 is connected in series with the low temperature solenoid circuit 316, while the temperature is above this level the circuit 224 is permanently broken so that it will be impossible to open the door 90.

As stated hitherto, if there is a failure of current when the temperature is below 138° F., and the low temperature solenoid 296 is energized to tilt the trip rocker 280, the rocker plunger 276 and trip rocker 280 will drop on such failure of current to cause the trip rocker projection 288 to drop on the latch 270 immediately above the pivot 272 which provides a neutral abutment, and the dropping of said projection 288 does not in any way affect the latch 270 to unlatch it. When, however, the high temperature solenoid 298 is energized, the abutment 288 will be pivoted outwardly so that if the current should fail, it will drop on the outer arm 271 of the latch 270 to pivot the projection 274 upwards out of its socket 266 in the latching pin 252, permitting the spring 262 to urge the latching pin 252 outwards out of its socket 248, permitting the weight 140 to actuate the cutter valve 138 to cause the fire inhibiting fluid to pass from the container 130 to the pipes 132, 134 and 136 within the casing 22, as indicated in dotted lines in Fig. 7.

Figs. 12 and 13 show the high temperature solenoid circuit 324 energized, with the projection 288 tilted to actuate the latch 270 on failure of current. Fig. 12 illustrates what happens when a rise in temperature above 138° F. in the initial normal time interval of tumbler operation. It will be noted, however, that the high temperature solenoid circuit 324 is energized, tilting the projection 288 in the manner aforesaid to actuate said latch 272, by means of de-energization of the thermostatically controlled circuit 336; permitting raising of the switch blade 326 by the spring 330 and causing energization of the red light circuit 344 to simultaneously light the red light as this circuit is connected in series with the high temperature solenoid circuit 324. Inasmuch, however, as this takes place during the normal time interval of tumbler operation, the time controlled switch 126 will not as yet have been closed to energize the solenoid circuit 198 to energize the solenoid coil 196 to actuate the connected relay switch blades 186 and 230. It will, therefore, be doubly impossible to complete the circuit 224 to remove the latch 106 from the bolt 88, and due to the fact that the yellow light circuit 180 is still completed by the combination relay 113 the yellow light 118 will continue to operate.

Fig. 13 illustrates what takes place should the rise in temperature above 138° F. take place after the normal time interval of tumbler operation after the closing of the time controlled switch 126 and consequent energization of the relay coil circuit 198. Due to the manner in which the green light circuit 190 is connected to the low temperature solenoid circuit 316, it is obvious that it will not come on during this period. The red light circuit 344 being connected in series with the high temperature solenoid circuit 324 will be energized to cause the red light to be lighted. In the event that the temperature rises above 138° F. either during the adjustable period of normal tumbling operation or after the completion of said period, the tumbler door keeps automatically closed, and until the temperature of the air flow is reduced below 138° F. and the tumbler completes its period of normal tumbling operation, it will be impossible to energize the circuit 224 to release the latch 106 from the bolt 88 to permit opening of the door on turning the handle 352 to actuate the cam 114 to close the switch 112. As stated, should the electric current fail or be turned off while the red light is showing, the valve 138 will be tripped open by the weight 140, flooding the tumbler with carbon dioxide ($CO_2$) which will positively inhibit fire or explosion, and which, as stated, is harmless to the garments.

It is apparent, therefore, that I have provided the heretofore described novel method of removing residual solvent from materials dry cleaned with an inflammable hydrocarbon solvent and the heretofore described novel drying apparatus with the advantages hitherto explained.

It is understood that my invention is not limited to the specific embodiment shown or method described and that various deviations may be made therefrom without departing from the spirit and scope of the appended claims.

What I claim is:

1. Apparatus for drying, comprising a casing, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, means to move said basket, means to actuate said air circulating means, a signal indicating normal operating movement of said basket and a signal indicating completion of the proper time interval of movement of said basket, timer means and means including means controlled by said timer means settable for adjustably variable time controlled intervals of operation of said timer means for changing signals, means including thermostatic means in said outlet duct controlled by the temperature of air in said outlet duct immediately adjacent said basket operable when the temperature rises above said predetermined degree and signal means actuated by said last means including thermostatic means, for indicating rise of temperature of the air in the outlet duct immediately adjacent said basket above said predetermined degree.

2. Apparatus for drying, comprising a casing, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, means to move said basket, means to actuate said air circulating means, means for flooding said basket and connected duct means with fire inhibiting fluid, means to release said flooding means on failure of actuation of said air circulating means and means including thermostatic means in said outlet duct controlled by the temperature of air in said outlet duct immediately adjacent said basket operable to actuate said flooding means releasing means only when the temperature of the air in the outlet duct immediately adjacent said basket rises above said predetermined degree.

3. Apparatus for drying, comprising a casing, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, means to move said basket, means to actuate said air circulating means, means for flooding said basket and connected duct means with fire inhibiting fluid, means to release said flooding means on failure of actuation of said air circulating means, means including thermostatic means in said outlet duct controlled by the temperature of air in said outlet duct immediately adjacent said basket operable to actuate said flooding means releasing means only when the temperature of the air in the outlet duct immediately adjacent said basket rises above said predetermined degree and signal means actuated by said last means including thermostatic means for indicating rise of temperature of said air in said outlet duct immediately adjacent said basket above said predetermined degree.

4. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, means to move said basket, means to actuate said air circulating means, means movable to a position simultaneously latching said door in closed position and starting the functioning of said air circulating and basket moving means, normally urged to a free position stopping actuation of said air circulating and basket moving means, means for retaining said movable latching means in latching position, means for releasing said latching means retaining means, manually operated means for controlling the functioning of said releasing means, timer means and means including means controlled by said timer means settable for adjustably variable time controlled intervals of operation of said timer means for actuating said means for releasing the retaining means for said door latching means and means including thermostatic means in said outlet duct controlled by the temperature of air in said outlet duct, immediately adjacent said basket operable to prevent actuation of said releasing means for the retaining means for the door latching means when the temperature of the air in the outlet duct rises above said predetermined degree.

5. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, means to move said basket, means to actuate said air circulating means, means movable to a position simultaneously latching said door in closed position and starting the functioning of said air circulating and basket moving means, normally urged to a free position stopping actuation of said air circulating and basket moving means, means for retaining said movable latching means in latching position, means for releasing said latching means retaining means, timer means and means including means controlled by said timer means settable for adjustably variable time controlled intervals of operation of said timer means for actuating said means for releasing the retaining means for said door latching means, and means including thermostatic means in said outlet duct controlled by the temperature of air in said outlet duct, immediately adjacent said basket operable to prevent actuation of said releasing means for the retaining means for the door latching means when the temperature of the air in the outlet duct immediately adjacent said basket rises above said predetermined degree.

6. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, means to move said basket, means to actuate said air circulating means, means movable to a position simultaneously latching said door in closed position and starting the functioning of said air circulating and basket moving means, normally urged to a free position stopping actuation of said air circulating and basket moving means, means for retaining said movable latching means in latching position, means for releasing said latching means retaining means, a signal indicating normal operating movement of said basket and a signal indicating completion of the proper time interval for movement of said basket, timer means and means including means controlled by said timer means settable for adjustably variable time controlled intervals of operation of said timer means for changing signals and for actuating said means for releasing the retaining means for said door latching means, and means including thermostatic means in said outlet duct controlled by the temperature of air in said outlet duct immediately adjacent said basket operable to prevent actuation of said releasing means for the retaining means for the door latching means when the temperature of the air in the outlet duct rises above said predetermined degree.

7. Apparatus for drying, comprising a casing, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, a signal indicating normal operating movement of said basket and a signal indicating completion of the proper time interval of movement of said basket, timer means and means including means controlled by said timer means settable for adjustably variable time controlled intervals of operation of said timer means for changing basket signals and thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, and signal means actuated by said thermostatically controlled means for indicating rise of temperature of the air in the outlet duct immediately adjacent said basket above said predetermined degree.

8. Apparatus for drying, comprising a casing, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, means for flooding said basket and connected duct means with fire inhibiting fluid, means to release said flooding means on failure of actuation of said air circulating means and thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, said thermostatic means also being operable to actuate said flooding means releasing means only when the temperature of the air in the outlet duct immediately adjacent said basket rises above said predetermined degree.

9. Apparatus for drying, comprising a casing, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, means for flooding said basket and connected duct means with fire inhibiting fluid, means to release said flooding means on failure of actuation of said air circulating means, thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, said thermostatic means also being operable to actuate said flooding means releasing means only when the temperature of the air in the outlet duct immediately adjacent said basket rises above said predetermined degree and signal means actuated by said thermostatic means for indicating rise of temperature of the air in the outlet duct immediately adjacent said basket above said predetermined degree.

10. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, means movable to a position simultaneously latching said door in closed position and starting the functioning of said air circulating and basket moving means, normally urged to a free position stopping actuation of said air circulating and basket moving means, means for retaining said movable latching means in latching position, means for releasing said latching means retaining means, manually operated means for controlling the functioning of said releasing means, timer means and means including means controlled by said timer means settable for adjustably variable time controlled intervals of operation of said timer means for actuating said means for releasing the retaining means for said door latching means and thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, said thermostatic means also being operable to prevent actuation of said releasing means for the retaining means for the door latching means when the temperature of the air in the outlet duct immediately adjacent said basket rises above said predetermined degree.

11. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, means movable to a position simultaneously latching said door in closed position and starting the functioning of said air circulating and basket moving means, normally urged to a free position stopping actuation of said air circulating and basket moving means, means for retaining said movable latching means in latching position, means for releasing said latching means retaining means, timer means and means including means controlled by said timer means settable for adjustably variable time controlled intervals of operation of said timer means for actuating said means for releasing the retaining means for said door latching means and thermostatic means in said outlet duct immediately adjacent said basket controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, said thermostatic means also being operable to prevent actuation of said releasing means for the retaining means for the door latching means when the temperature of the air in the outlet duct immediately adjacent said basket rises above said predetermined degree.

12. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, means movable to a position simultaneously latching said door in closed position and starting the functioning of said air circulating and basket moving means, normally urged to a free position stopping actuation of said air circulating and basket moving means, means for retaining said movable latching means in latching position, means for releasing said latching means retaining means, a signal indicating normal operating movement of said basket and a signal indicating completion of the proper time interval for movement of said basket, timer means, means including means controlled by said timer means settable for adjustably variable time controlled intervals of operation of said timer means for changing basket signals and for actuating said means for releasing the retaining means for said door latching means and means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, said thermostatic means also being operable to prevent actuation of said releasing means for the retaining means for the door latching means when the temperature of the air in the outlet duct immediately adjacent said basket rises above said predetermined degree, and signal means actuated by said thermostatically controlled means for indicating a rise of temperature of the air in the outlet duct immediately adjacent said basket above said predetermined degree.

13. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, means movable to a position simultaneously latching said door in closed position and starting the functioning of said air circulating and basket moving means, normally urged to a free position stopping actuation of said air circulating and basket moving means, means for retaining said movable latching means in latching position, means for releasing said latching means retaining means, manually operated means for controlling the functioning of said releasing means, means for actuating said means for releasing the retaining means for said door latching means and means including thermostatic means in said apparatus in the path of the drying air after it has passed through said preheating means, operable to prevent actuation of said releasing means for the retaining means for the door latching means when the temperature of said air rises above a non-inflammable predetermined degree.

14. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, electric motor means for moving said basket and actuating said air circulating means, a control circuit, means for flooding said casing with fire inhibiting fluid on occurrence of a temperature within said outlet duct above a predetermined level, means for releasing said flooding means including a tiltable member selectively droppable to a neutral position or to a position releasing said flooding means, a low temperature solenoid normally connected to said control circuit having a solenoid rod pivotally connected to said tiltable member to normally tilt it on energization thereof to drop to said neutral position on failure of current, a high temperature solenoid actuatable by said control circuit also having a solenoid actuated rod pivotally connected to said tiltable member to tilt it on energization thereof to drop to said position releasing said flooding means on failure of current, a relay for selectively switching the effective low and high temperature solenoids, a thermostatically controlled switch connected to said control circuit to actuate said relay and thermostatic means in said outlet duct immediately adjacent said basket to actuate said switch.

15. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, electric motor means for moving said basket and actuating said air circulating means, a control circuit, means for flooding said casing with fire inhibiting fluid on occurrence of a temperature within said outlet duct above a non-inflammable predetermined degree, a danger signal, means for releasing said flooding means including a tiltable member selectively droppable to a neutral position or to a position releasing said flooding means, a low temperature solenoid normally connected to said control circuit having a solenoid rod pivotally connected to said tiltable member to normally tilt it on energization thereof to drop to said neutral position on failure of current, a high temperature solenoid actuable in association with said danger signal by said control circuit also having a solenoid actuated rod pivotally connected to said tiltable member to tilt it on energization thereof to drop to said position releasing said flooding means on failure of current, a relay for selectively switching the effective low and high temperature solenoids and actuating said danger signal, a thermostatically controlled switch connected to said control circuit to actuate said relay and thermostatic means in said outlet duct immediately adjacent said basket to actuate said switch.

16. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said basket for controlling said preheating means to maintain the temperature of the air containing cleaning fluid after contact with said garments below a predetermined non-inflammable degree, motor means for moving said basket and actuating said air circulating means, an electric circuit for actuating said motor means having a magnetic starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, timer means actuated by said control circuit, a timer means controlled switch for controlling said latching means retaining rod solenoid relay actuated by said control circuit having a member moved to closed position by said timer means adjustably settable to regulate the time interval of inaction of said relay after closing said door to start said motor means, and a manually operated safety switch in series with said door latching means retaining rod solenoid.

17. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, motor means for moving said basket and actuating said air circulating means, an electric circuit for actuating said motor means having a magnetic starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, timer means actuated by said control circuit, and a timer means controlled switch for controlling said latching means retaining rod solenoid relay actuated by said control circuit having a member moved to closed position by said timer means adjustably settable to regulate the time interval of inaction of said relay after closing said door to start said motor means.

18. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, motor means for moving said basket and actuating said air circulating means, an electric circuit for actuating said motor means having a magnetic starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, a signal indicating basket movement normally actuated by said control circuit, a signal indicating completion of desired time interval of basket movement actuatable by said control circuit, a relay for switching said signals, timer means actuated by said control circuit, a timer means controlled switch for controlling said signal relay and said latching means retaining rod solenoid relay actuated by said control circuit having a member moved to closed position by said timer means adjustably settable to regulate the time interval of inaction of said relays after closing said door to start said motor means, and a manually operated safety switch in series with said door latching means retaining rod solenoid.

19. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, electric motor means for moving said basket and actuating said air circulating means, a control circuit, means for flooding said casing with fire inhibiting fluid on occurrence of a temperature within said apparatus in the path of the drying air above a non-inflammable predetermined degree, means for releasing said flooding means including a tiltable member selectively droppable to a neutral position or to a position releasing said flooding means, a low temperature solenoid normally connected to said control circuit having a solenoid rod pivotally connected to said tiltable member to normally tilt it on energization thereof to drop to said neutral position on failure of current, a high temperature solenoid actuatable by said control circuit also having a solenoid actuated rod pivotally connected to said tiltable member to tilt it on energization thereof to drop to said position releasing said flooding means on failure of current, a relay for selectively switching the effective low and high temperature solenoids, a thermostatically controlled switch, connected to said control circuit to actuate said relay and thermostatic means in said apparatus in the path of the drying air after it has passed through said preheating means to actuate said switch when the temperature of said air rises above said predetermined degree.

20. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, motor means for moving said basket and actuating said air circulating means, an electric circuit for actuating said motor means having a starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, and thermostatic means in said apparatus in the path of the drying air to actuate said relay when the temperature of said air rises above said predetermined degree and a manually operated safety switch in series with said door latching means retaining rod solenoid.

21. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, motor means for moving said basket and actuating said air circulating means, an electric circuit for actuating said motor means having a magnetic starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, timer means actuated by said control circuit, and a timer means controlled switch for controlling said latching means retaining rod solenoid relay actuated by said control circuit having a member moved to closed position by said timer means adjustably settable to regulate the time interval of inaction of said relay after closing said door to start said motor means.

22. Apparatus for drying, comprising a casing having a door, a garment containing basket movable within said casing, duct means in said casing for passing drying air through said basket including and inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct reduced by the latent heat of evaporation of cleaning fluid in said garments in said basket for controlling said preheating means to maintain the temperature of the air containing cleaning fluid after contact with said garments below a predetermined non-inflammable degree, electric motor means for moving said basket and actuating said air circulating means, an electric circuit for actuating said motor means, a signal indicating basket movement normally actuated by said control circuit, a signal indicating completion of desired time interval of basket movement actuatable by said control circuit, a relay for switching said signals, timer means actuated by said control circuit, a timer means controlled switch for controlling said signal relay and actuated by said control circuit having a member moved to closed position by said timer means adjustably settable to regulate the time interval of inaction of said relays after starting said motor means, a signal, and thermostatic means in said outlet duct controlled by the temperature of air in said outlet duct immediately adjacent said basket operative above said predetermined degree of temperature therein to actuate said last mentioned signal.

23. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, electric motor means for moving said basket and actuating said air circulating means, an electric circuit for actuating said motor means, means for flooding said casing with fire inhibiting fluid, normally inactive electric control means for releasing said flooding means on a failure of current and thermostatic means in said outlet duct controlled by the temperature of air in said outlet duct immediately adjacent said basket operative above said predetermined degree of temperature therein to render said control means active.

24. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, electric motor means for moving said basket and actuating said air circulating means, an electric circuit for actuating said motor means, means for flooding said casing with fire inhibiting fluid, a signal, normally inactive electric control means for releasing said flooding means on a failure of current, and thermostatic means in said outlet duct controlled by the temperature of air in said outlet duct immediately adjacent said basket operative above a predetermined degree of temperature therein to render said control means active and to actuate said signal.

25. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct controlled by the temperature of the air in said outlet duct immediately adjacent said basket reduced by the latent heat of evaporation of cleaning fluid in said garments in said basket for controlling said preheating means to maintain the temperature of the air containing cleaning fluid after contact with said garments below a predetermined non-inflammable degree, electric motor means for moving said basket and actuating said air circulating means, an electric circuit for actuating said motor means having a magnetic starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, timer means actuated by said control circuit, a timer means controlled switch for controlling said latching means retaining rod solenoid relay actuated by said control circuit having a member moved to closed position by said timer means adjustably settable to regulate the time interval of inaction of said relay after closing said door to start said motor means, and thermostatic means in said outlet duct controlled by the temperature of air in said outlet duct immediately adjacent said basket operative above said predetermined degree of temperature therein to positively disconnect said latching means retaining rod solenoid.

26. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means including thermostatic means in said outlet duct immediately adjacent said basket controlled by the temperature of the air in said outlet duct reduced by the latent heat of evaporation of cleaning fluid in said garments in said basket for controlling said preheating means to maintain the temperature of air containing cleaning fluid after contact with said garments below a predetermined non-inflammable degree, electric motor means for moving said basket and actuating said air circulating means, an electric circuit for actuating said motor means having a magnetic starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, a signal indicating basket movement normally actuated by said control circuit, a signal indicating completion of desired time interval of basket movement actuatable by said control circuit, a relay for switching said signals, timer means actuated by said control circuit, a timer means controlled switch for controlling said signal relay and said latching means retaining rod solenoid relay actuated by said control circuit having a member moved to closed position by said timer means adjustably settable to regulate the time interval of inaction of said relays after closing said door to start said motor means, and thermostatic means in said outlet duct controlled by the temperature of air in said outlet duct immediately adjacent said basket operative above said predetermined degree of temperature therein to positively disconnect said latching means retaining rod solenoid.

27. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, electric motor means for moving said basket and actuating said air circulating means, an electric circuit for actuating said motor means, means for flooding said casing with fire inhibiting fluid, normally inactive electric control means for releasing said flooding means on a failure of current and thermostatic means in said apparatus in the path of the drying air after it has passed through said preheating means operative above a non-inflammable predetermined degree of temperature of said air to render said control means active.

28. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, electric motor means for moving said basket and actuating said air circulating means, an electric circuit for actuating said motor means having a magnetic starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, timer means actuated by said control circuit, a timer means controlled switch for controlling said latching means retaining rod solenoid relay actuated by said control circuit having a member moved to closed position by said timer means adjustable settable to regulate the time interval of inaction of said relay after closing said door to start said motor means, and thermostatic means in said apparatus in the path of the drying air after it has passed through said preheating means operative above a predetermined non-inflammable degree of temperature of said air to positively disconnect said latching means retaining rod solenoid.

29. Apparatus for drying, comprising a casing, a tumbling garment containing basket rotatable within said casing, duct means in said casing for passing drying air through said casing, including an inlet duct to said basket and an outlet duct from said basket, a fan to force a current of air through said duct means, means to heat said air prior to passage through said basket, a main source of electric supply, a motor for simultaneously rotating said tumbler and said fan, a circuit for said motor having a starter switch therein, means for flooding said tumbler with fire inhibiting fluid on occurrence of a temperature within said outlet duct above a predetermined degree, comprising a container having a normally closed discharge valve therein, a weight urging said valve to open position having a latching pin socket therein, a latching pin movable to a position having the end thereof contained in said socket for retaining said weight in raised inoperative position having a latch socket therein, means urging said latching pin out of said socket, a pivotally mounted latch having a projection normally contained in said latch socket, a rocker plunger having a longitudinal vent therein and a trip rocker pivotally mounted thereon having a solenoid actuated rod pivotally mounted on each end thereof, a low temperature solenoid for pivoting said trip rocker to a position to drop on a neutral abutment on failure of electric current, and a high temperature solenoid for pivoting said trip rocker to a position to drop on failure of electric current to a position releasing said latch causing withdrawal of said latching pin from said latching pin socket releasing said weight to open said fire inhibiting fluid discharge valve, an air-check cylinder enclosing said vented plunger having an adjustable air vent therein permitting slight movements of the plunger for momentary current interruptions and complete dropping of the plunger on exposure of its air vent, a circuit connected to the main control circuit for actuating the low temperature solenoid having a normally closed relay switch therein, a circuit connected to said main control circuit for actuating said high temperature solenoid having a normally open relay switch therein, a relay coil for simultaneously actuating said relay switches to shut off said low temperature solenoid circuit and actuate said high temperature solenoid circuit, a thermostatically controlled switch and thermostatic means in said apparatus in the path of said drying air after it has passed through said preheating means to move said thermostatically controlled switch to open position when the temperature rises above a predetermined non-inflammable degree, and a relay coil circuit connected to said main control circuit having said thermostatic switch therein effective to actuate said relay coil on a rise above said predetermined degree of temperature of said air in said outlet duct.

30. Apparatus for drying, comprising a casing, a tumbling garment containing basket rotatable within said casing, duct means in said casing for passing drying air through said casing, including an inlet duct to said basket and an outlet duct from said basket, a fan to force a current of air through said duct means, means to heat said air prior to passage through said basket, a main source of electric supply, a motor for simultaneously rotating said tumbler and said fan, a circuit for said motor having a starter switch therein, means for flooding said tumbler with fire inhibiting fluid on occurrence of a temperature within said outlet duct above a predetermined degree, comprising a container having a normally closed discharge valve therein, a weight urging said valve to open position having a latching pin socket therein, a latching pin movable to a position having the end thereof contained in said latching pin socket for retaining said weight in raised inoperative position having a latch socket therein, means urging said latching pin out of said socket, a pivotally mounted latch having a projection normally contained in said latch socket, a rocker plunger having a trip rocker pivotally mounted thereon, having a solenoid actuated rod pivotally mounted on each end thereof, a low temperature solenoid for pivoting said trip rocker to a position to drop on a neutral abutment on failure of electric current, and a high temperature solenoid for pivoting said trip rocker to a position to drop on failure of electric current to a position releasing said latch causing withdrawal of said latching pin from said latching pin socket releasing said weight to open said fire inhibiting fluid discharge valve, a circuit connected to the main control circuit for actuating the low temperature solenoid having a normally closed relay switch therein, a circuit connected to said main control circuit for actuating said high temperature solenoid having a normally open relay switch therein, a relay coil for simultaneously actuating said relay switches to shut off said low temperature solenoid circuit and actuate said high temperature solenoid circuit, a thermostatically controlled switch and thermostatic means in said apparatus in the path of said drying air after it has passed through said preheating means to move said thermostatically controlled switch to open position when the temperature rises above a predetermined non-inflammable degree, and a relay coil circuit connected to said main control circuit having said thermostatic switch therein effective to actuate said relay coil on a rise above said predetermined degree of temperature of said air in said outlet duct.

31. Apparatus for drying, comprising a casing, a tumbling garment containing basket rotatable within said casing, duct means in said casing for passing drying air through said casing including an inlet duct to said basket and an outlet duct from said basket, a fan to force a current of air through said duct means, a main source of electric supply, a motor for simultaneously rotating said basket and said fan, a circuit for said motor having a relay starter switch therein, a door for said casing, a slidable bolt for locking said door in closed position, means normally urging said bolt to open position, a latch for holding said door bolt in latched position, a bolt receiving socket in said casing to hold said bolt when in closed position, a main control circuit connected to said source of electric supply having a switch therein in said bolt socket closed by said bolt when moved to a position locking said door, a motor switch actuating circuit connected to said main control circuit having a relay coil therein for actuating said motor line relay switch to operatively connect said motor circuit only when said door is bolted, a solenoid for releasing said door bolt latch, a circuit connected to the main control circuit for actuating said solenoid, and a switch in said solenoid actuating circuit manually controlled from exterior of said solenoid actuating casing to close said circuit to actuate said solenoid to release said door bolt latch to permit opening of said door only after stoppage of said fan and motor.

32. Apparatus for drying, comprising a casing, a tumbling garment containing basket rotatable within said casing, duct means in said casing for passing drying air through said casing including an inlet duct to said basket and an outlet duct from said basket, a fan to force a current of air through said duct means, a main source of electric supply, a motor for simultaneously rotating said basket and said fan, a circuit for said motor having a magnetic relay starter switch therein, a door for said casing, a slidable bolt for locking said door in closed position, means normally urging said bolt to open position, a latch for holding said door bolt in latched position, a bolt receiving socket in said casing to hold said bolt when in closed position, a main control circuit connected to said source of electric supply having a switch therein in said bolt socket closed by said bolt when moved to a position locking said door, a motor switch actuating circuit connected to said main control circuit having a relay coil therein for actuating said motor line relay switch to operatively connect said motor circuit only when said door is bolted, an electric timer clock having a synchronous motor, a circuit for driving said timer motor connected to said main control circuit, a solenoid for releasing said door bolt latch, and a circuit connected to the main control circuit for actuating said solenoid having a relay switch therein closed by said timer on completion of the normal tumbling operation.

33. Apparatus for drying, comprising in combination, a casing having a door, a garment containing perforate basket movable within said casing, means for passing drying air through said basket including an inlet duct to said casing and an outlet duct from said casing and means to circulate a current of drying air through said ducts and basket, means to preheat said air prior to passage through said basket, electric motor means for moving said basket and actuating said air circulating means, an electric circuit for actuating said motor means, means for flooding said casing with fire inhibiting fluid, normally inactive electric control means for rendering said flooding means operative on a failure of current in said electric circuit and thermostatic means in said apparatus in the path of said drying air operative above a predetermined temperature of said drying air to render said control means active.

34. Apparatus for drying, comprising in combination, a casing, a garment containing perforate basket movable within said casing, means for passing drying air through said basket including an inlet duct to said casing and an outlet duct from said casing and means to circulate a current of drying air through said ducts and basket, means to preheat said air prior to passage through said basket, means to move said basket, means to actuate said air circulating means, means for flooding said basket and ducts with fire inhibiting fluid, means to release said flooding means on failure of actuation of said air circulating means, and means including thermostatic means in said apparatus in the path of said drying air operable to actuate said flooding means releasing means only when the temperature of said drying air rises above a predetermined degree.

35. Apparatus for drying, comprising in combination, a casing having an opening in a wall thereof, a door for closing said opening, a perforate basket movable within said casing, means for passing drying air through said basket including an inlet duct to said casing and an outlet duct from said casing and means to circulate a current of drying air through said ducts and basket, means to preheat said air prior to passage through said basket, means to move said basket, means to actuate said air circulating means, means movable to a position simultaneously latching said door in closed position and starting operation of said air circulating and basket moving means, means for retaining said latching means in latching position, means for moving said retaining means to position to release said latching means and means including thermostatic means in said apparatus in the path of said drying air, operable to prevent actuation of said moving means for the retaining means to position to release the door latching means while the temperature of said drying air is above a predetermined degree.

36. Apparatus for drying, comprising in combination, a casing having an opening in a wall thereof, a door for closing said opening, a perforate basket movable within said casing, means for passing drying air through said basket including an inlet duct to said casing and an outlet duct from said casing and means to circulate a current of drying air through said ducts and basket, means to preheat said air prior to passage through said basket, electric motor means to operate said air circulating means and to move said basket, a circuit for said electric motor means having a switch therein, means movable to a position simultaneously latching said door in closed position and closing said switch, means for retaining said latching means in latching position, means for releasing said retaining means and means including thermostatic means in said apparatus in the path of said drying air, operable to prevent actuation of said releasing means when the temperature of said drying air is above a predetermined degree.

37. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, means to move said basket, means to actuate said air circulating means, means movable to a position simultaneously latching said door in closed position and starting the functioning of said air circulating and basket moving means, normally urged to a free position stopping actuation of said basket moving means, means for retaining said movable latching means in latching position, means for releasing said latching means retaining means, externally operated means for controlling the functioning of said releasing means, for actuating said means for releasing the retaining means for said door latching means, means for flooding said basket and connected duct means with fire inhibiting fluid, means to release said flooding means on failure of actuation of said air circulating means including thermostatic means in said apparatus in the path of the drying air operable only to permit operation of said flooding means releasing means and to supplementally prevent actuation of said releasing means for the retaining means for the door latching means when the temperature rises above a predetermined degree, and signal means actuated by said thermostatically controlled means for indicating rise of temperature of said air above said predetermined degree.

38. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket means to preheat said air prior to passage through said basket, means to move said basket, means to actuate said air circulating means, means movable to a position simultaneously latching said door in closed position and starting the functioning of said air circulating and basket moving means, normally urged to a free position stopping actuation of said basket moving means, means for retaining said movable latching means in latching position, means for releasing said latching means retaining means, externally operated means for controlling the functioning of said releasing means, for actuating said means for releasing the retaining means for said door latching means, means for flooding said basket and connected duct means with fire inhibiting fluid, means to release said flooding means on failure of actuation of said air circulating means, means including thermostatic means in said apparatus in the path of the drying air operable only to permit operation of said flooding means releasing means and to supplementally prevent actuation of said releasing means for the retaining means for the door latching means when the temperature rises above a predetermined degree.

39. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, motor means for moving said basket and actuating said air circulating means, an electric circuit for actuating said motor means having a starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, a switch for controlling said latching means retaining rod solenoid relay actuated by said control circuit, means for flooding said casing with fire inhibiting fluid on occurrence of a temperature in said duct means above a predetermined level, a signal, means for releasing said flooding means including a tiltable member selectively droppable to a neutral position or to a position releasing said flooding means, a low temperature solenoid normally connected to said control circuit in series with said latching means retaining rod solenoid relay having a solenoid rod pivotally connected to said tiltable member to normally tilt it on energization thereof to drop to said neutral position on failure of current, a high temperature solenoid actuatable in association with said signal by said control circuit also having a solenoid actuated rod pivotally connected to said tiltable member to tilt it on energization thereof to drop to said position releasing said flooding means on failure of current, a relay for selectively switching the effective low and high temperature solenoids and actuating said signal, a thermostatically controlled switch connected to said control circuit to actuate said last mentioned relay, thermostatic means in said apparatus in the path of the drying air for controlling said switch and an externally manually operated switch in series with said door latching means retaining rod solenoid.

40. Apparatus for drying, comprising a casing having a door, a garment containing basket movable within said casing, duct means in said casing for passing drying air through said basket including an inlet duct to said basket and an outlet duct from said basket, means to circulate a current of drying air through said duct means and basket, means to preheat said air prior to passage through said basket, motor means for moving said basket and actuating said air circulating means, an electric circuit for actuating said motor means having a starting relay switch therein, means normally urged to an open position movable to a position latching said door in closed position, a main control circuit actuating said starting switch having a switch therein closed by said movable latching means, a solenoid having a movable solenoid actuated rod normally urged to a position retaining said movable latching means in latching position, a normally open relay for actuating said solenoid, a switch for controlling said latching means retaining rod solenoid relay actuated by said control circuit, means for flooding said casing with fire inhibiting fluid on occurrence of a temperature in said duct means above a predetermined level, means for releasing said flooding means including a tiltable member selectively droppable to a neutral position or to a position releasing said flooding means, a low temperature solenoid normally connected to said control circuit in series with said latching means retaining rod solenoid relay having a solenoid rod pivotally connected to said tiltable member to normally tilt it on energization thereof to drop to said neutral position on failure of current, a high temperature solenoid actuatable by said control circuit also having a solenoid actuated rod pivotally connected to said tiltable member to tilt it on energization thereof to drop to said position releasing said flooding means on failure of current, a relay for selectively switching the effective low and high temperature solenoids, a thermostatically controlled switch connected to said control circuit to actuate said last mentioned relay, thermostatic means in said apparatus in the path of the drying air for controlling said switch and an externally manually operated switch in series with said door latching means retaining rod solenoid.

41. A drying chamber for use in dry cleaning, comprising in combination, a housing having an opening therein, a closure for said opening, a movable latch for said closure, a movable member for locking said latch in closure latching position normally urged to said locking position, an electric motor solenoid to move said locking member to unlocking position, an electric circuit having a switch therein controlling the operation of said motor, a supplemental manually actuated switch in said motor circuit, a thermostat within said housing controlling said first switch effective to break said circuit to render said motor non-energizeable to permit said locking member to remain in a position preventing said latch from being moved into closure opening position when the temperature of the atmosphere in said housing is above a predetermined degree and effective to close said circuit when said temperature is below said predetermined degree and said manually actuated switch is closed to actuate said motor to remove said locking member from the position locking said latch to permit movement of said latch into closure opening position, and means for heating said housing comprising a heater and means for circulating air through said heater and said housing.

42. A drying chamber for use in dry cleaning, comprising in combination, a housing having an opening therein, a closure for said opening, a movable latch for said closure, having a detent normally spring urged to open position, a movable rod to engage said detent for locking said latch in closure latching position normally urged to said position, an electric motor solenoid to move said locking rod to unlocking position free of said detent, an electric circuit having a switch therein controlling the operation of said motor, a supplemental manually actuated switch in said motor circuit, a thermostat within said housing controlling said first switch effective to break said circuit to render said motor non-energizeable to permit said locking rod to remain in position engaging said detent preventing said latch from being moved into closure opening position when the temperature of the atmosphere in said housing is above a predetermined degree and effective to close said circuit when said temperature is below said predetermined degree and said manual actuated switch is closed to actuate said motor to remove said locking rod from engagement with the detent in said latch to permit movement of said latch into closure opening position, and means for heating said housing comprising a heater and means for circulating air through said heater and said housing.

NICHOLAS MONSARRAT.

REFERENCES CITED

The following references are of record in the file of this patent:

UNITED STATES PATENTS

| Number | Name | Date |
|---|---|---|
| 1,339,374 | Buensod | May 4, 1920 |
| 1,605,634 | Wright | Nov. 2, 1926 |
| 1,675,160 | Carroll | June 26, 1928 |
| 1,786,191 | Carroll | Dec. 23, 1930 |
| 1,795,418 | Bailey | Mar. 10, 1931 |
| 2,045,381 | Elberty, Jr. | June 23, 1936 |
| 2,050,625 | Orr | Aug. 11, 1936 |
| 2,105,778 | Behr et al. | Jan. 18, 1938 |
| 2,142,042 | Bowdoin et al. | Dec. 27, 1938 |
| 2,143,505 | Arnold | Jan. 10, 1939 |
| 2,203,422 | Strobridge | June 4, 1940 |
| 2,217,153 | Bowdoin et al. | Oct. 8, 1940 |
| 2,360,915 | Vermilya | Oct. 24, 1944 |

FOREIGN PATENTS

| Number | Country | Date |
|---|---|---|
| 472,674 | Germany | Mar. 11, 1929 |